US006276665B1

(12) United States Patent
Hawkins et al.

(10) Patent No.: US 6,276,665 B1
(45) Date of Patent: Aug. 21, 2001

(54) MOBILE FLOOR CRANE

(75) Inventors: Joseph O. Hawkins, Greer; John H. Blackburn, Greenville; Terry Jerome Hawkins, Travelers Rest; Roy David Brookshire, Travelers Rest; Frances Hawkins Stewart, Travelers Rest, all of SC (US)

(73) Assignee: Sunex International, Inc., Greenville, SC (US)

( * ) Notice: Subject to any disclaimer, the term of this patent is extended or adjusted under 35 U.S.C. 154(b) by 0 days.

(21) Appl. No.: 09/562,468

(22) Filed: May 1, 2000

Related U.S. Application Data

(60) Provisional application No. 60/145,878, filed on Jul. 27, 1999.

(51) Int. Cl.[7] ........................................ B60P 1/48

(52) U.S. Cl. ........................................ 254/8 B; 254/124

(58) Field of Search ..................... 269/17, 901; 254/124, 254/8 B, 8 R, 2 B, 2 R, 4 B, 4 R

(56) References Cited

U.S. PATENT DOCUMENTS

| | | |
|---|---|---|
| 4,334,668 | 6/1982 | Caris . |
| 5,011,364 | 4/1991 | Anderson . |
| 5,076,448 | 12/1991 | Ballard . |
| 5,261,640 | 11/1993 | Yuan . |
| 5,556,148 | 9/1996 | Skinner . |
| 5,897,100 | 4/1999 | Napier et al. . |

OTHER PUBLICATIONS

Snap–on Catalog, 1995, Kenosha, Wisconsin, p. E91.
Arcan Catalog #100, 1998, Travelers Rest, South Carolina, cover and pp. 1–3.
Sears Catalog, 1992, pp. 536–537.
NAPA Tools & Equipment Catalog No. 196, 1996, p. 398.
MAC Tools Catalog, 1997, pp. 182 & 183.
NORCO Catalog, 1985, Compton, California.
Sunex International Catalog, 1981, Greenville, South Carolina, mobile cranes.
Astro Pneumatic Tool Company Catalog, 1998, City of Industry, California, p. 65.
OTC A–94 Catalog, 1994, pp. D–12 and D–13.
Sunex International Spring & Summer “Sizzler” Brochure, 1982.
Blue–Point Brochure ½Ton Capacity Engine Stand, published at least as early as 1997.

*Primary Examiner*—Derris H. Banks
*Assistant Examiner*—Daniel Shanley
(74) *Attorney, Agent, or Firm*—Dority & Manning, P.A.

(57) ABSTRACT

A mobile floor crane has a tubular, rigid stanchion that supports a boom pivotally connected to the top end of the stanchion. The base end of the stanchion is disposed between the adjacently disposed mid portions of the tubular, rigid legs of the crane. A support member extends transversely through the mid portions of the legs and the base end of the stanchion and supports the stanchion. In an alternative embodiment, the legs have telescoping members, and a rolling member is provided on the base end of the stanchion to provide mobility for the crane when the telescoping members are detached for storage.

30 Claims, 25 Drawing Sheets

MOBILE FLOOR CRANE

PRIORITY CLAIM

The present application hereby claims priority based on provisional application Serial No. 60/145,878, filed Jul. 27, 1999.

BACKGROUND OF THE INVENTION

The present invention relates to floor cranes and more particularly to mobile floor cranes used in the automotive aftermarket.

Conventional mobile floor cranes such as shown in U.S. Pat. Nos. 3,931,956 and 4,669,703 typically have a pair of legs and a cross piece forming a bridge connecting the two legs and supporting the central upright stanchion of the crane. The legs and the cross piece typically are formed of tubular steel for increased strength. However, the strength of the cross piece and the strength of its connection to the two legs limit the amount of weight that can be lifted by the crane. The lateral distance between the stanchion and the legs provides a bending moment that can apply a twisting force to the legs and cause the crane to fail. Attempts to stabilize the legs against twisting have included the provision of a caster under each leg in the vicinity of the crosspiece as shown in U.S. Pat. No. 5,076,448. However, this then shifts the load from being carried by the rear wheels to being carried by the wheels beneath the legs by the crosspiece, and this shift has the undesirable effect of reducing the overall footprint of the load-carrying components of the crane. In the end, one type of instability is traded for another type of instability.

Moreover, construction of these so-called bridge-type cranes wherein the cross piece forms a bridge between the two legs, involves multiple manufacturing operations like metal cutting, hole-drilling, positioning, welding, and bolting. These manufacturing operations, and particularly the welding operations, add significantly to the overall cost of the crane. For example, the cross piece must be sized and cut, and in some embodiments the cross piece must be welded to the base and/or the legs. A crane design that could eliminate the cross piece might be produced less expensively than a comparable bridge-type crane due to the elimination of fabrication materials, fabrication time, and fabrication operations involving the cross piece.

Precise positioning of the parts relative to one another before they are welded also plays a significant role in the cost of manufacture of these conventional cranes. If the upright stanchion is located off-center relative to the two legs, then the load carried by the stanchion will not be evenly distributed between both legs of the crane. The off-center stanchion may wiggle or tend to tilt in use. Thus, siting of the stanchion atop the cross piece must be done with care, or the stanchion will be off center and the crane will need to be rejected. Rejects lead to waste that increases the cost of production. Moreover, the cumulative tolerances for the parts involved in positioning the stanchion can result in errors that cause a misalignment that might not be detectable by the eye of the user who assembles the crane.

OBJECTS AND SUMMARY OF THE INVENTION

It is a principal object of the present invention to provide an improved mobile floor crane that has an equivalent or greater lifting capacity as conventional cranes yet is configured so as to be less costly to manufacture.

It is another principal object of the present invention to provide a method of making a mobile floor crane that reduces the cost of making the crane without sacrificing the lifting capacity of the resulting crane.

It is a further principal object of the present invention to provide a mobile floor crane that easily disassembles for shipment and storage yet is less expensive to manufacture than a conventional crane without any reduction in the lifting capacity of comparable conventional cranes.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

A portable lifting device such as a mobile floor crane includes a stanchion carried by a mobile base. The base can be rendered mobile by wheels, rollers, or casters attached to the base. The wheels, rollers, or casters are disposed symmetrically with respect to a stanchion carried by the base. The base is formed by a pair of legs that are configured identically and disposed so as to be mirror images of each other. The stanchion is a rigid, vertically elongated, upright member that is centrally disposed relative to the legs. The stanchion is desirably formed of tubular steel having a generally rectangular transverse cross section along the entire length thereof.

Each leg is desirably formed of tubular steel having a generally rectangular transverse cross section along the entire length thereof. Each leg has a rear portion, a mid portion, and a forward portion. In forming the base, the legs are disposed alongside one another such that the mid portions are side-by-side and opposed to one another such that each leg is the mirror image of the other. Along the mid portions of the legs, the legs are separated from each other by a distance that is not substantially more than the width of the stanchion. Each leg has a means for rendering the crane mobile. This typically can include a wheel assembly to support the free end of the forward portion of each leg and a caster to support the free end of the rear portion of each leg.

In accordance with a presently preferred embodiment of the invention, the base end of the stanchion is disposed between the mid portions of the legs and mounted on a support bolt passing transversely through the mid portions of both legs and the base end of the stanchion. In the preferred case, the separation between the mid portions of the legs only allows sufficient clearance for the stanchion to be pivotable about the support bolt during assembly. Once assembled, the support bolt desirably places the stanchion and the mid portions of the legs under compression, thus substantially reducing any bending moments that might twist the legs under load.

In still further accordance with a presently preferred embodiment of the invention, the mid portions of both the left and right legs are permanently attached to a unitary tubular member that functions as the rear portions of both legs and defines the spacing between the mid portions of the legs. In an alternative embodiment, a spacer is disposed between the mid portions of the legs in the vicinity of the rear portions of the legs. The spacer is formed by a rigid block that has substantially the same width as the width of the stanchion. The unitary tubular member and the spacer desirably can be formed of the same stock of tubular steel as the stanchion. In another alternative embodiment, a back brace is disposed between and connecting the rear portions of the legs.

In accordance with a presently preferred embodiment of the invention, an obtuse angle is formed between the mid portion and the forward portion of each leg. Desirably, this angle is formed by bending the unitary tubular member that is used to form each leg.

In accordance with a presently preferred embodiment of the invention, a second angle is formed between the rear portion and the mid portion of each leg. In an alternative embodiment, this angle is also formed by bending the unitary tubular member that is used to form each leg.

By eliminating the cross piece and supporting the stanchion on the support bolt, the bending moment associated with the cross piece is also eliminated. Thus, the crane of the present invention is stronger than conventional cranes of the same dimensions and thus has greater lifting capacity. Moreover, the lifting device of the present invention is less costly to manufacture than conventional cranes. Because of the construction of the lifting device of the present invention, it is less likely that the stanchion will be installed off center.

The accompanying drawings, which are incorporated in and constitute a part of this specification, illustrate one embodiment of the invention and, together with the description, serve to explain the principles of the invention.

Figure 5D:
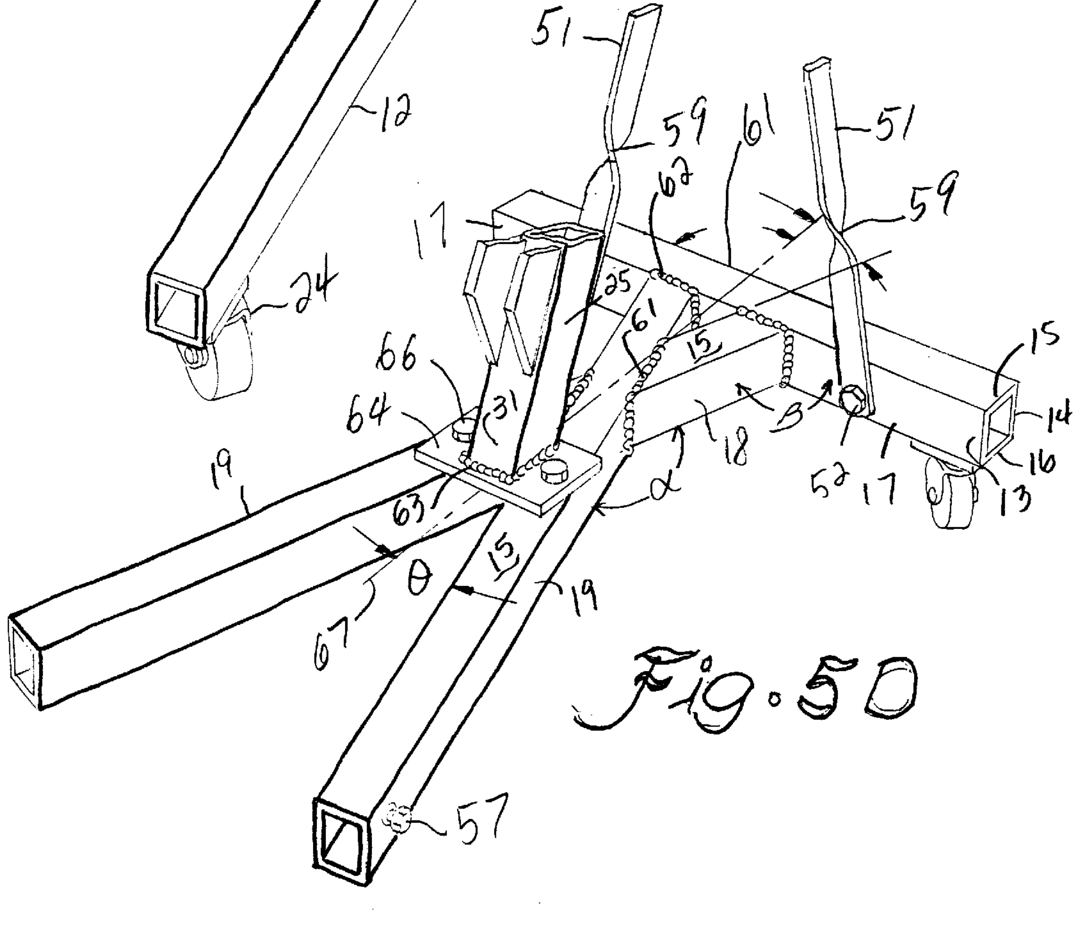
FIG. 5D is a view similar to that of FIG. 4C, but of a different embodiment of the present invention.
Figure 4C:
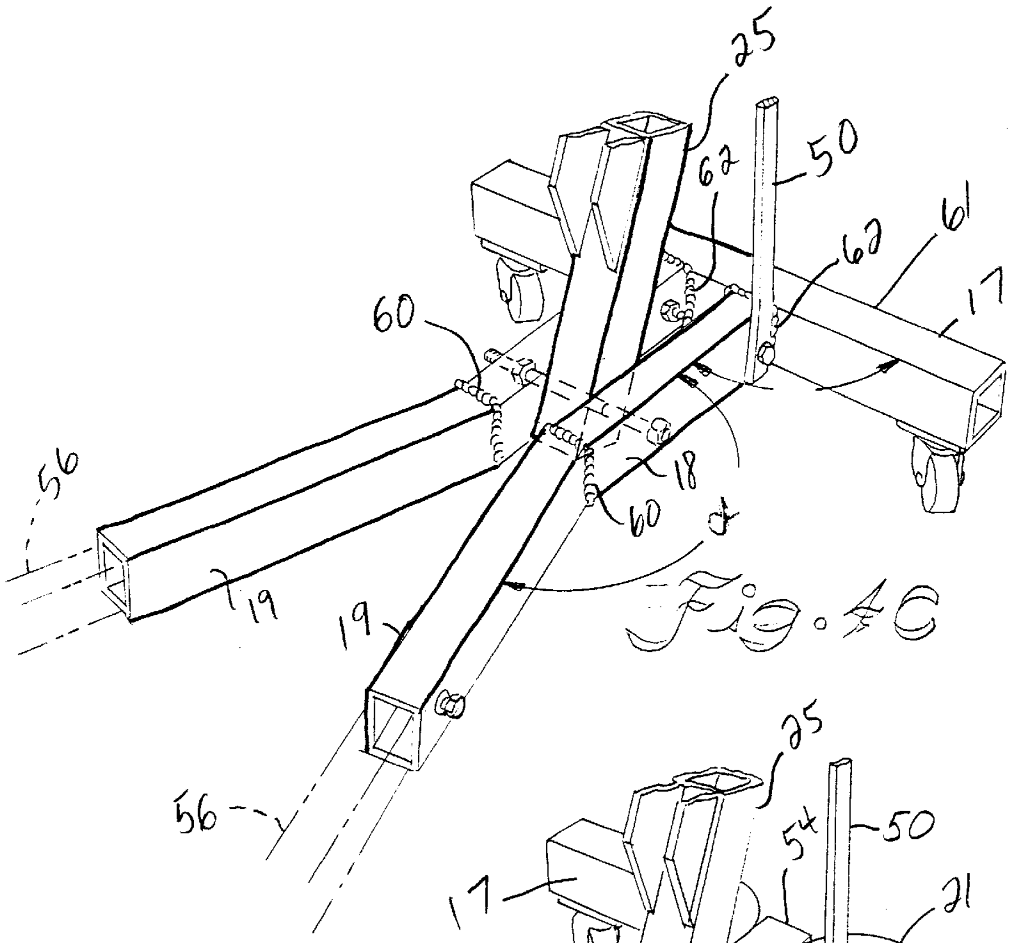
FIG. 4C is a view similar to that of FIG. 4B, but of a different embodiment of the present invention.
Figure 4D:
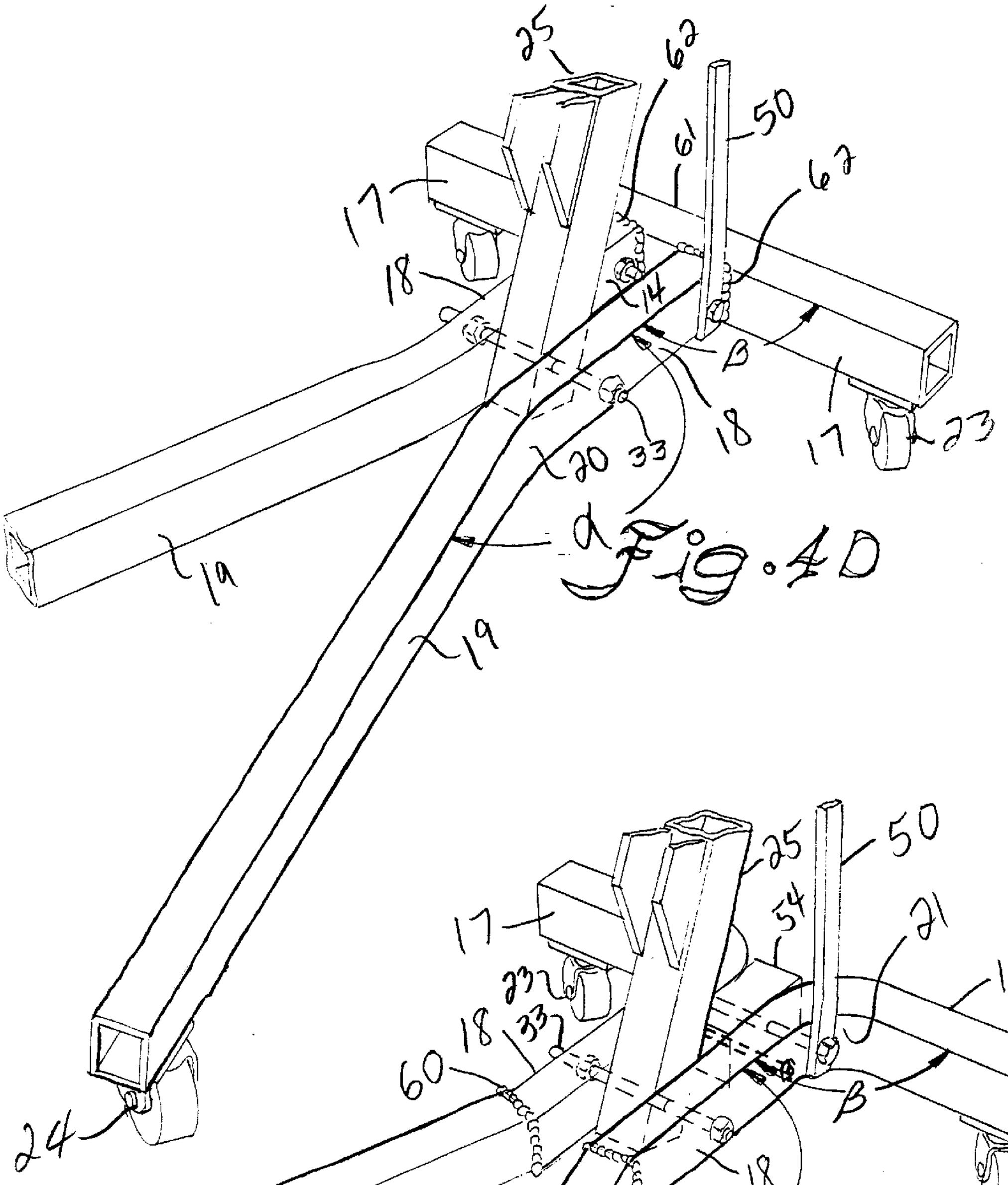
FIG. 4D is a view similar to that of FIG. 4B, but of a different embodiment of the present invention.
Figure 4A:
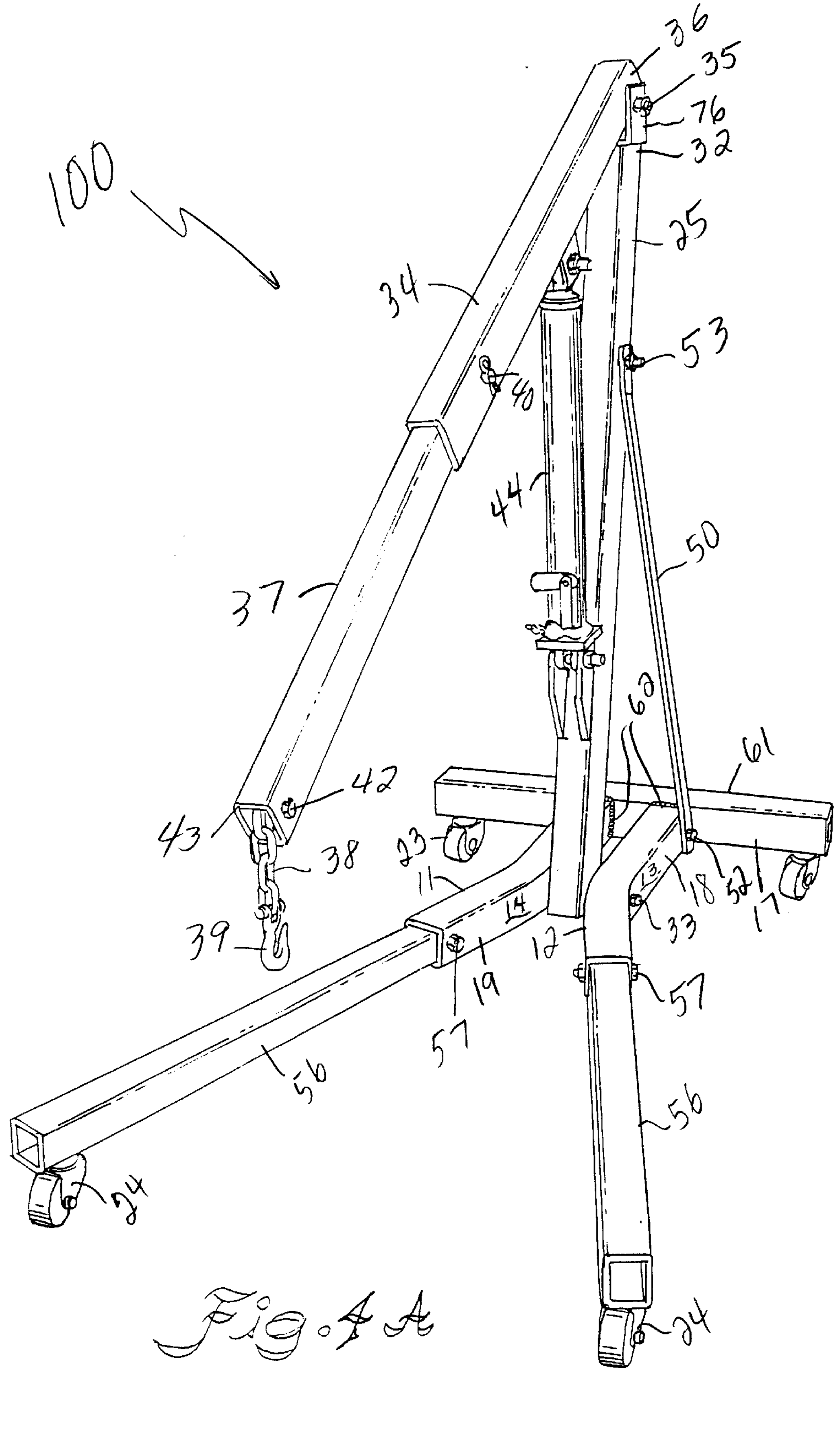
FIG. 4A is an elevated perspective view of a presently preferred embodiment of a mobile lifting device according to the present invention.
Figure 4B:
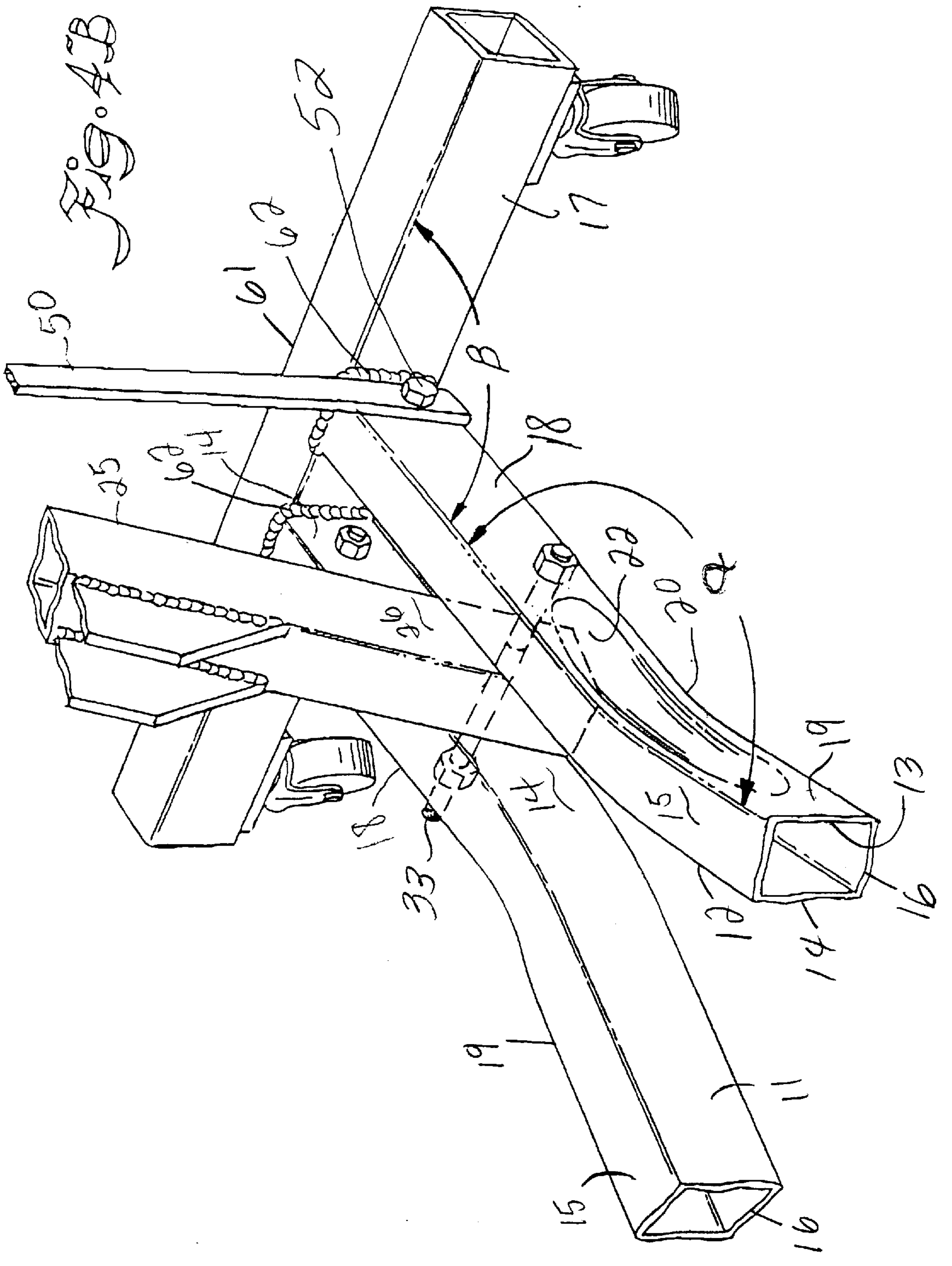
FIG. 4B is an elevated perspective partial view of the device shown in FIG. 4A.
Figure 5A:
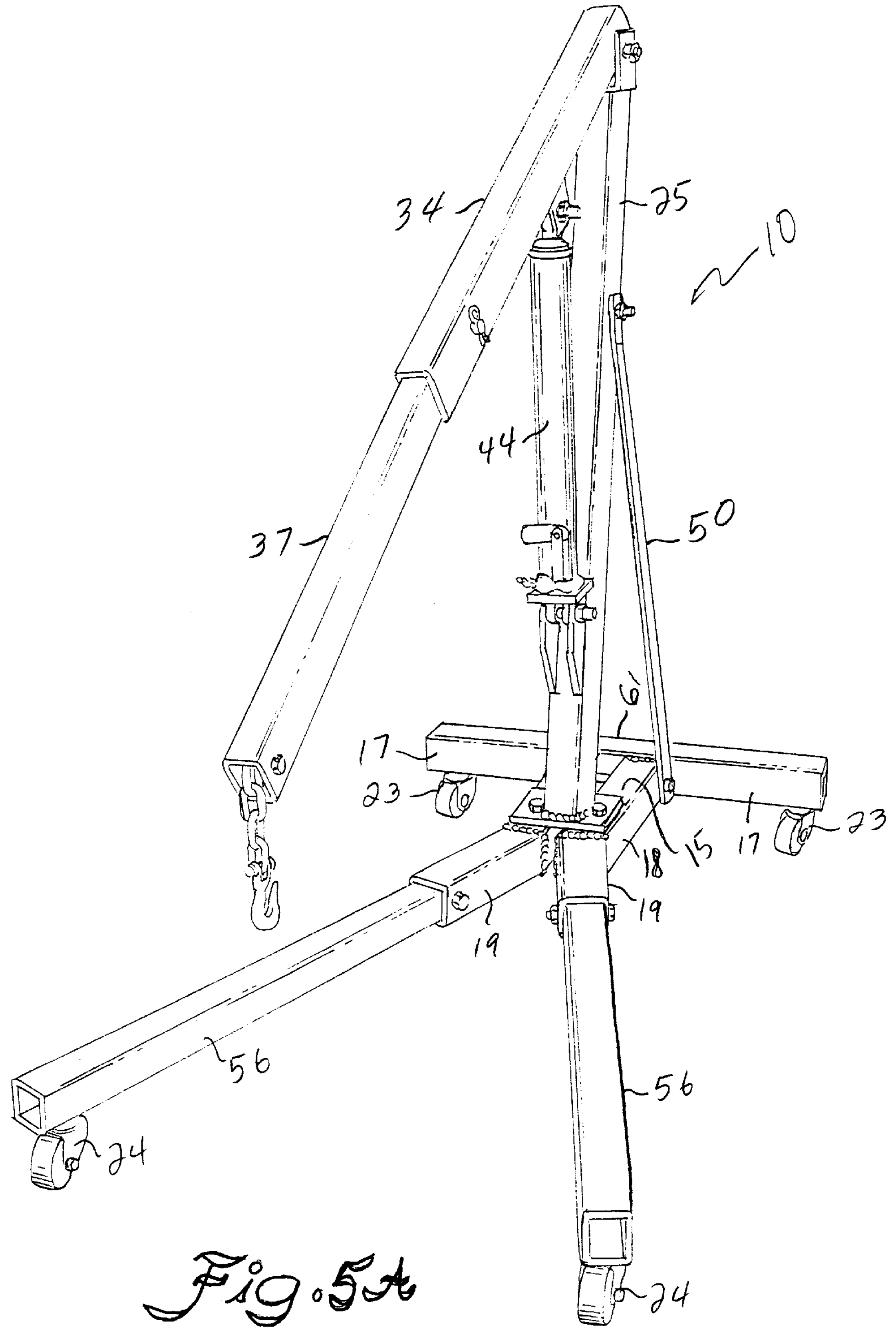
FIG. 5A is an elevated perspective view of another alternative embodiment of a mobile lifting device according to the present invention.
Figure 5B:
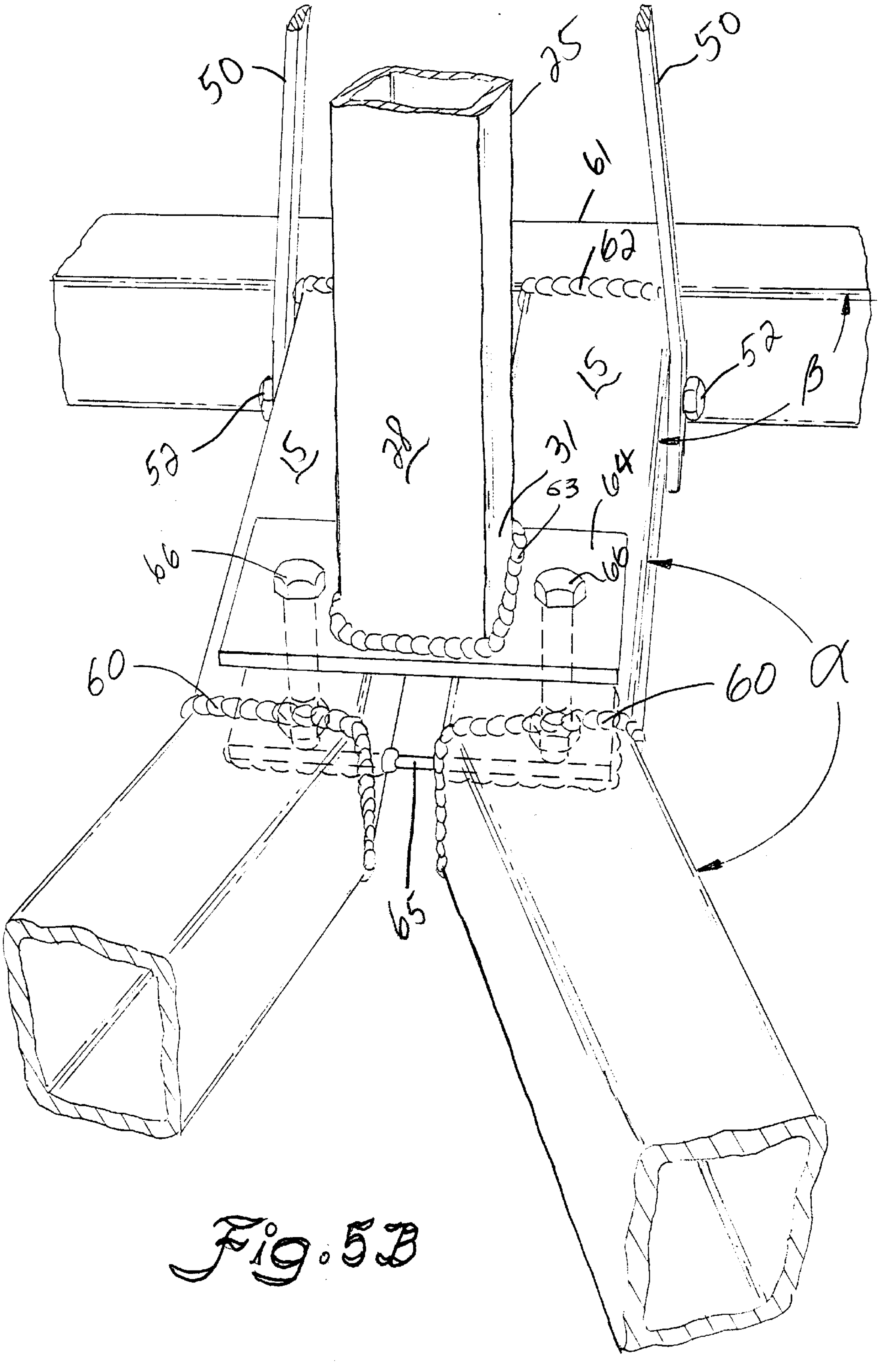
FIG. 5B is an elevated perspective partial view of the device shown in FIG. 5A.
Figure 5C:
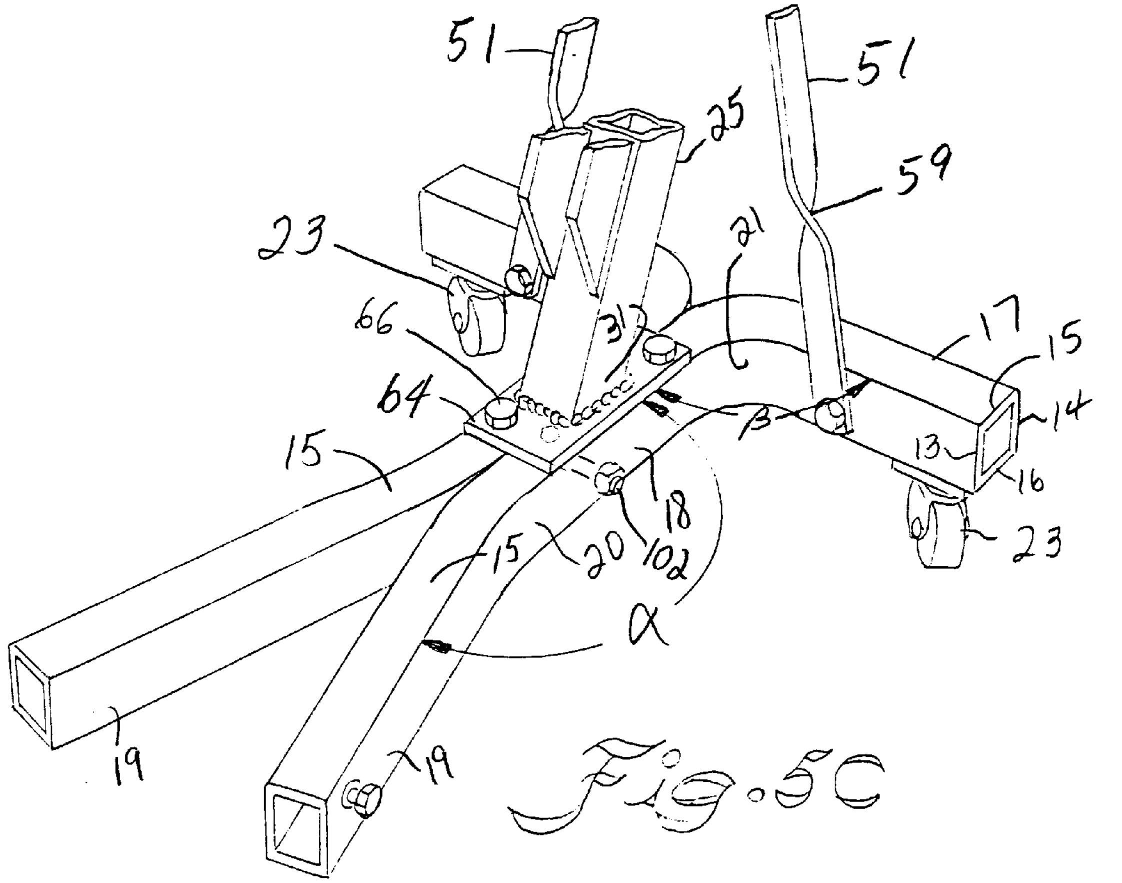
FIG. 5C is a view similar to that of FIG. 2B, but of a different alternative embodiment of the present invention.
Figure 7:
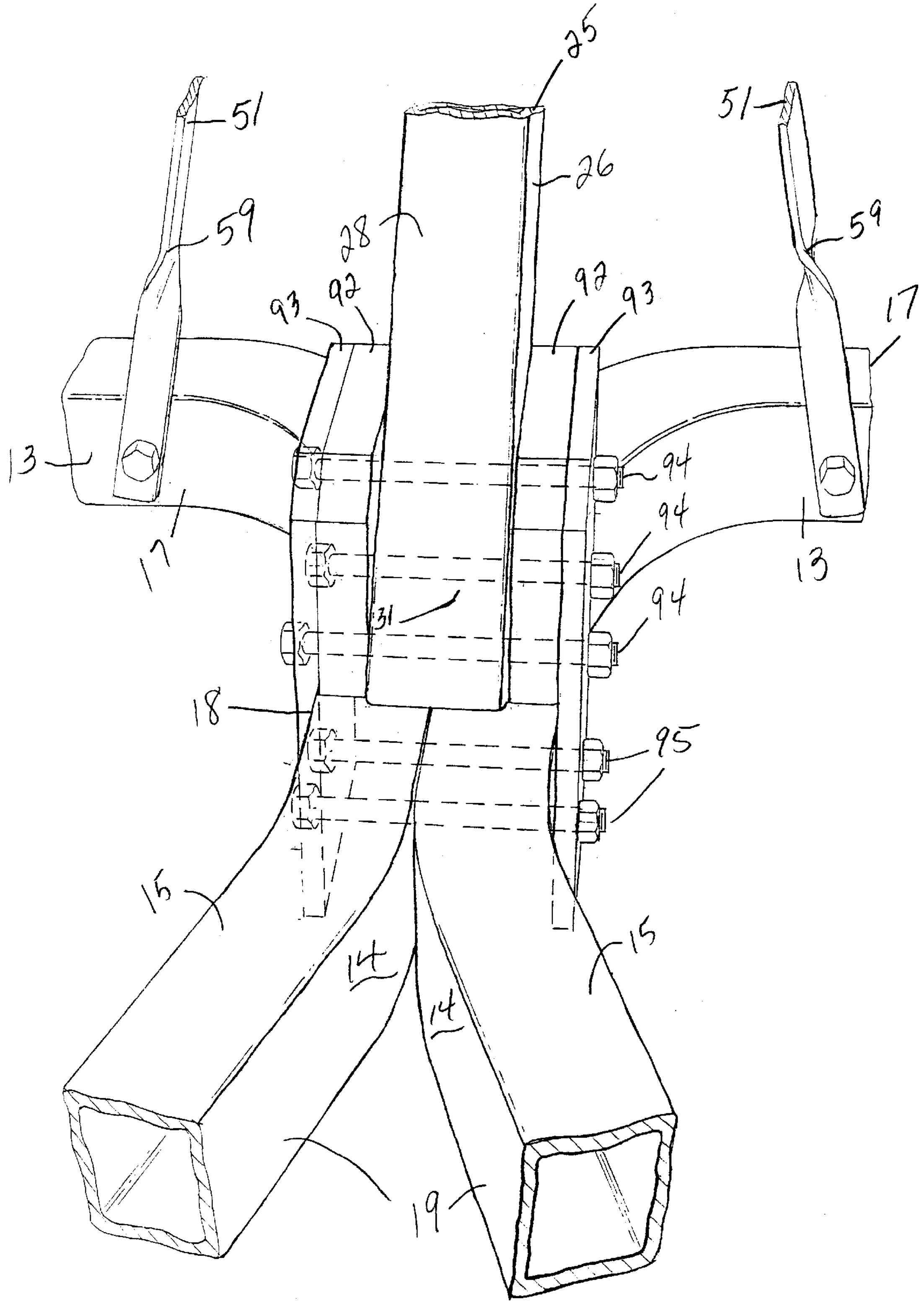
Figure 8:
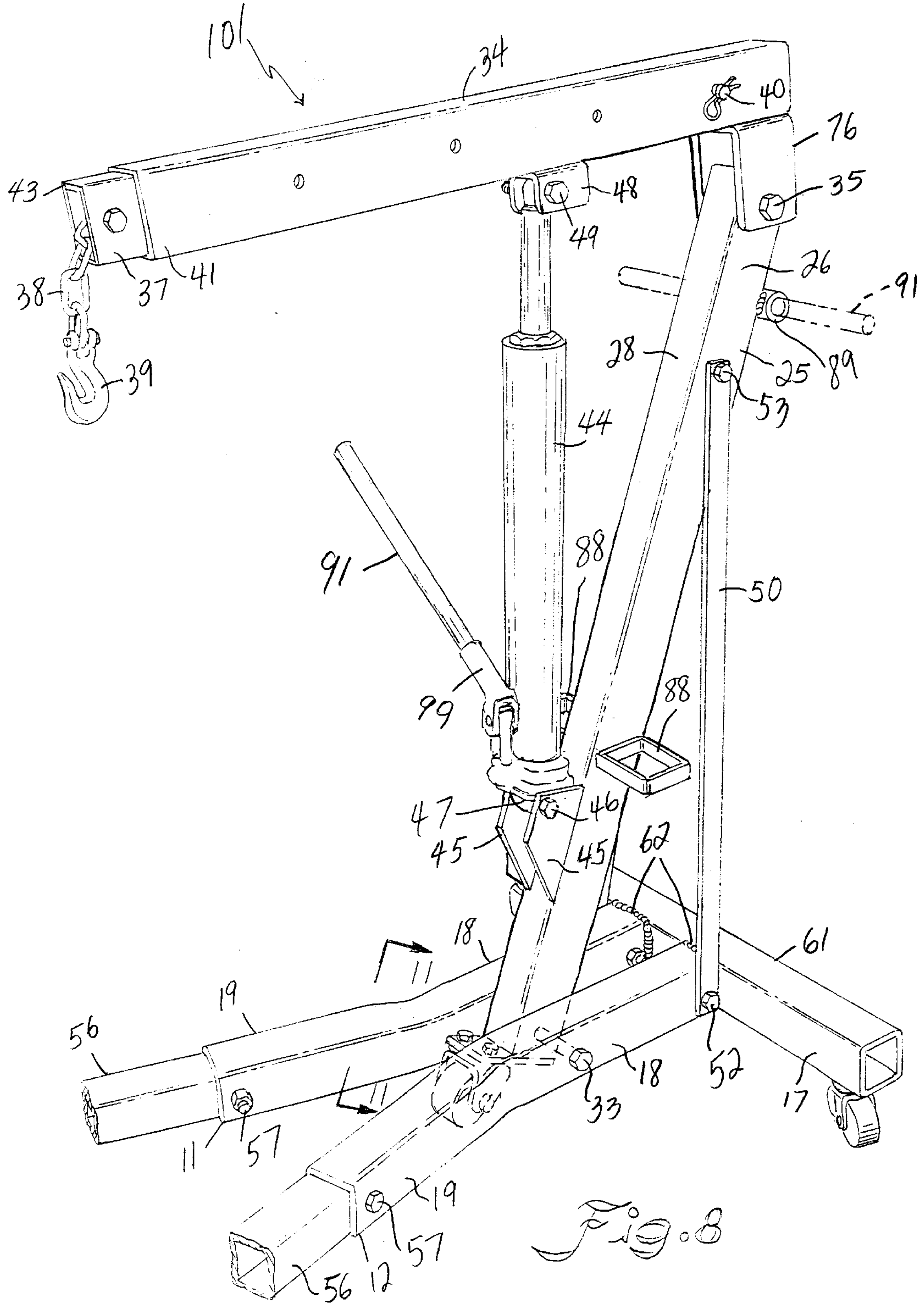
Figure 9:
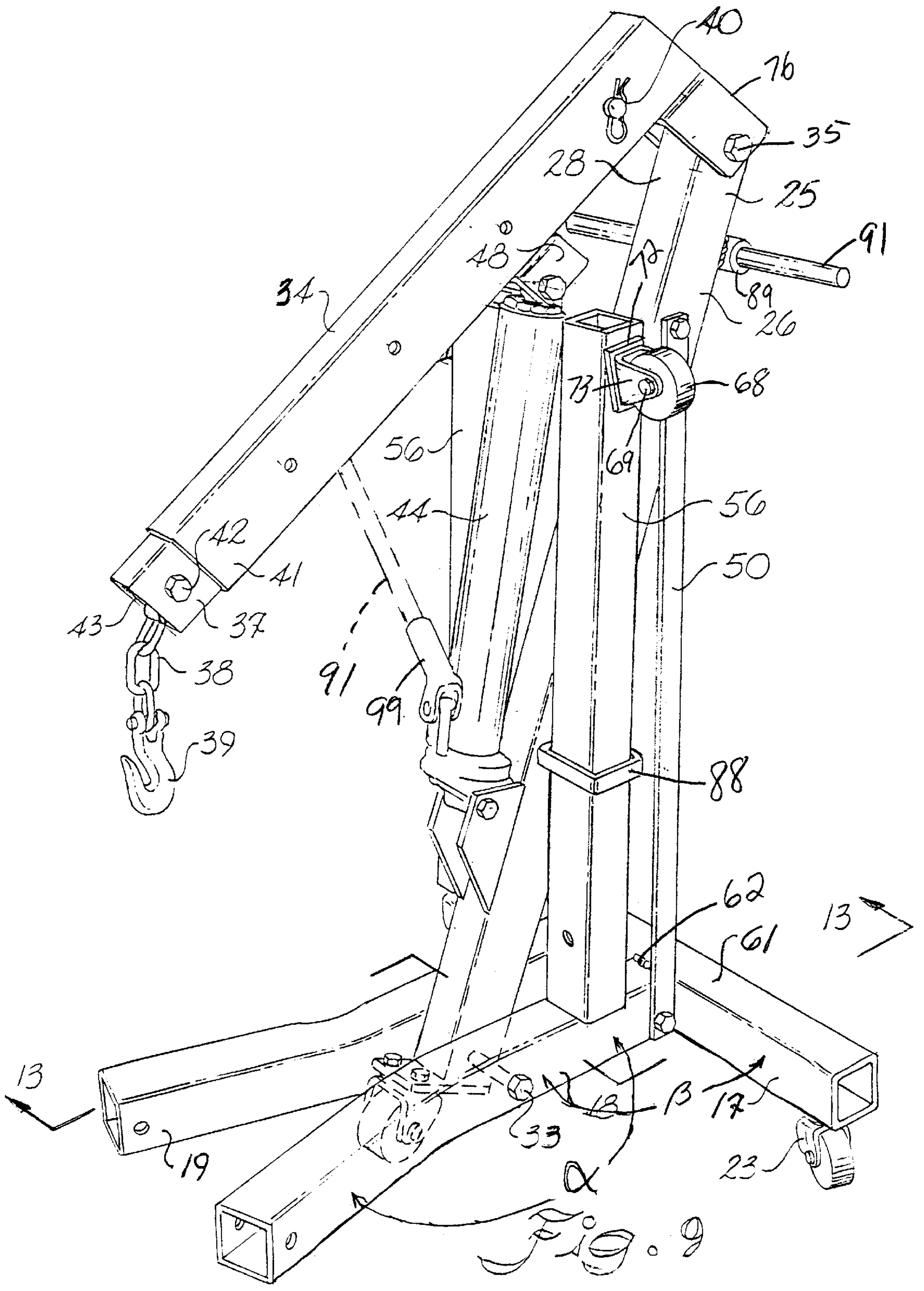
Figure 10:
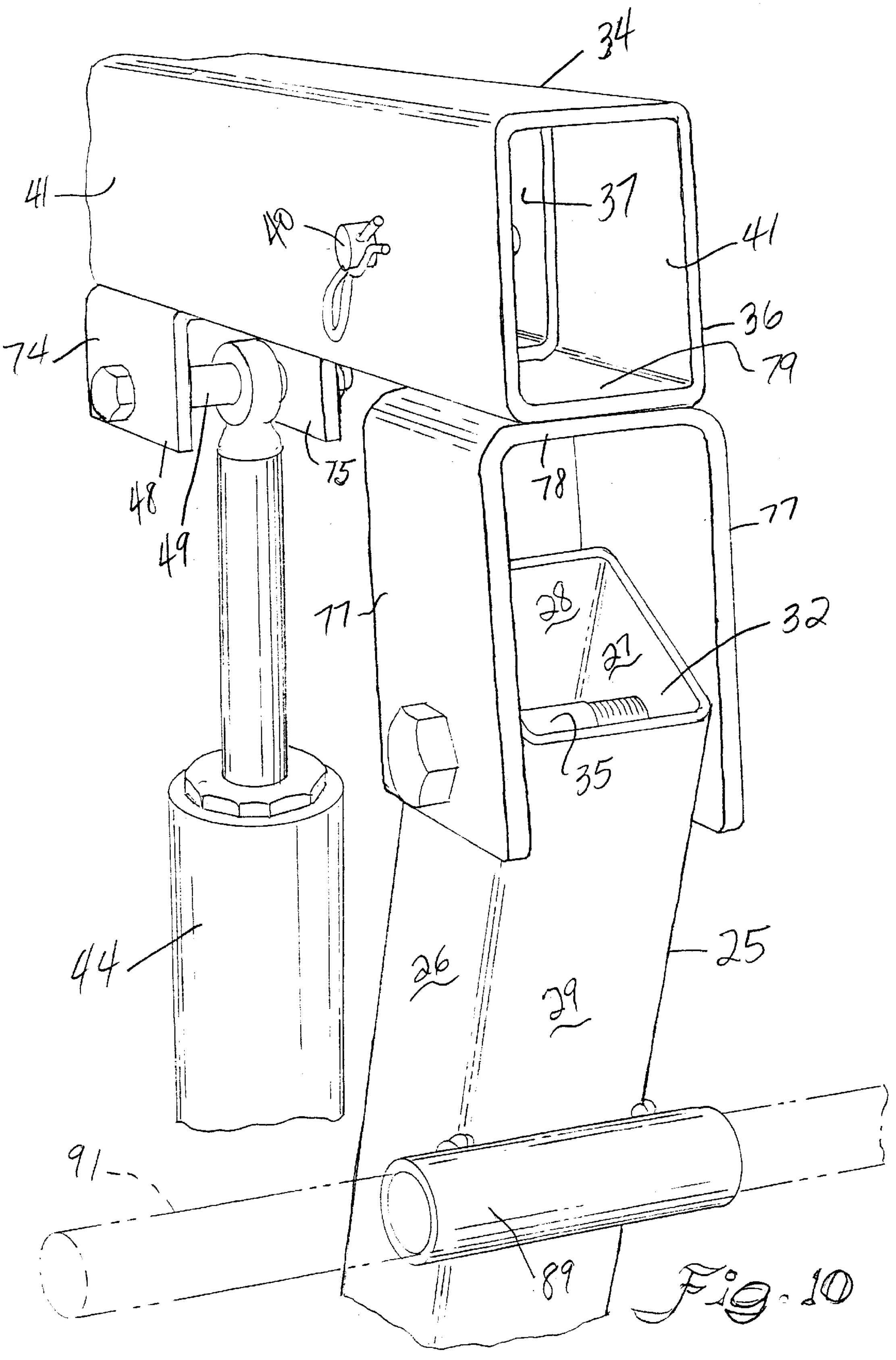
Figure 11:
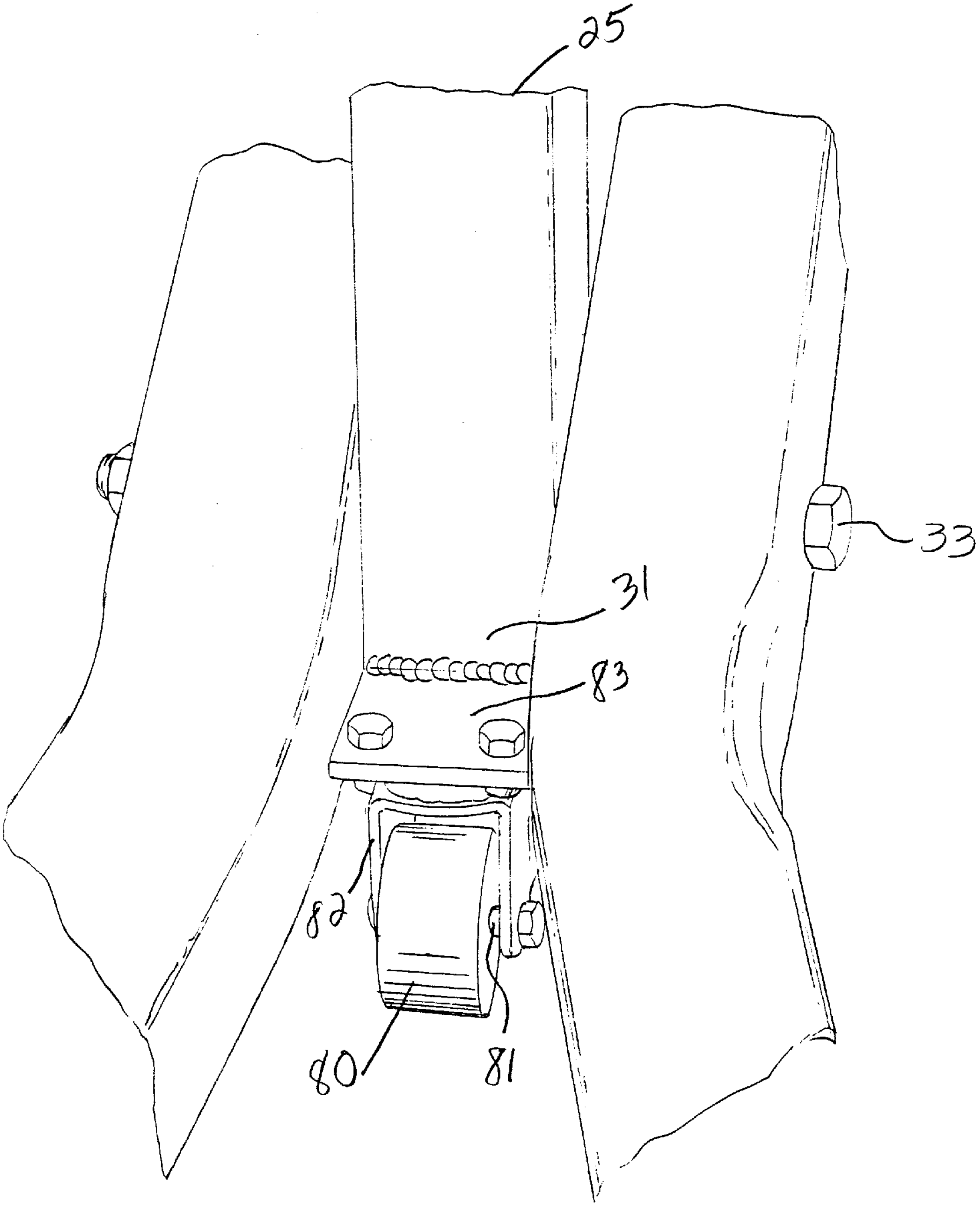
Figure 12A:
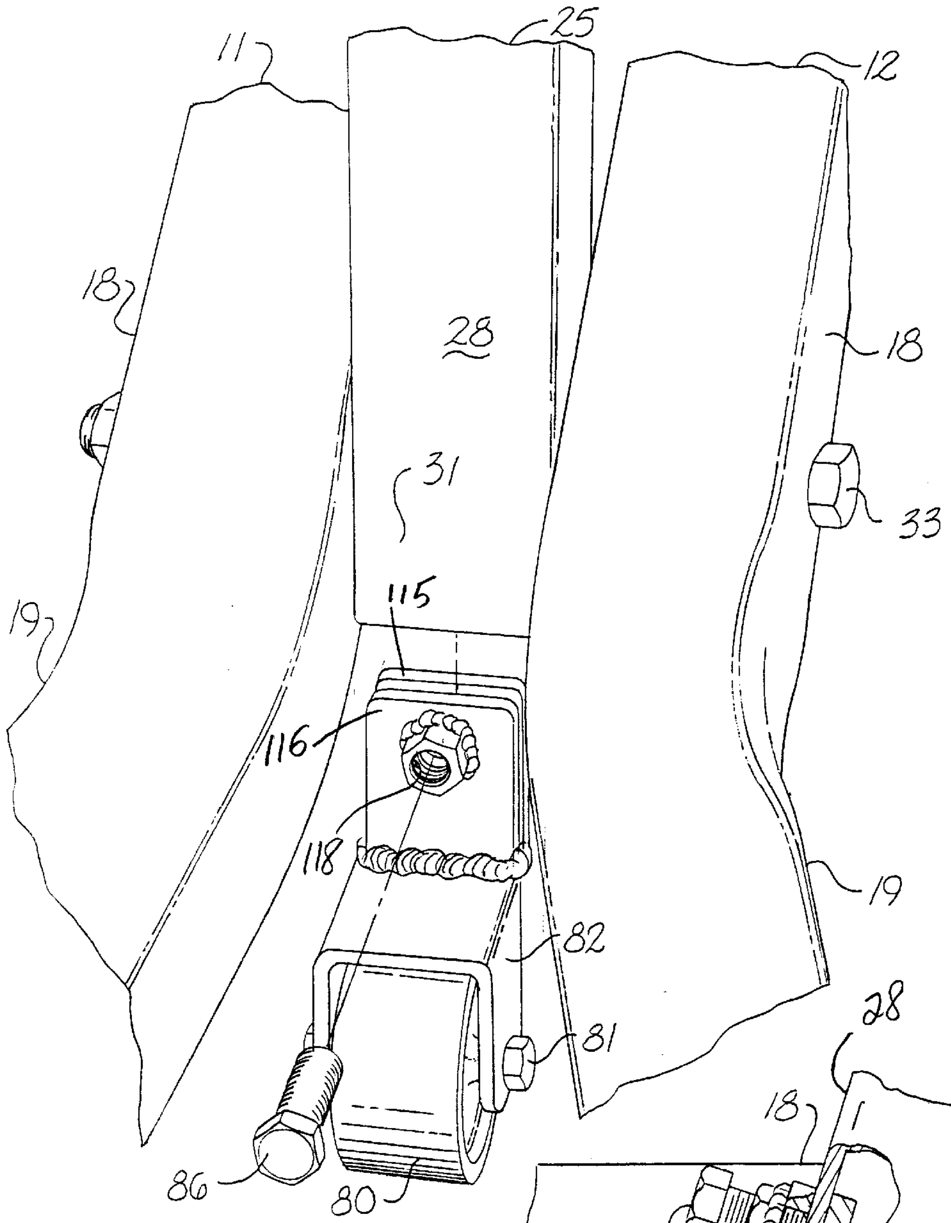
Figure 12B:
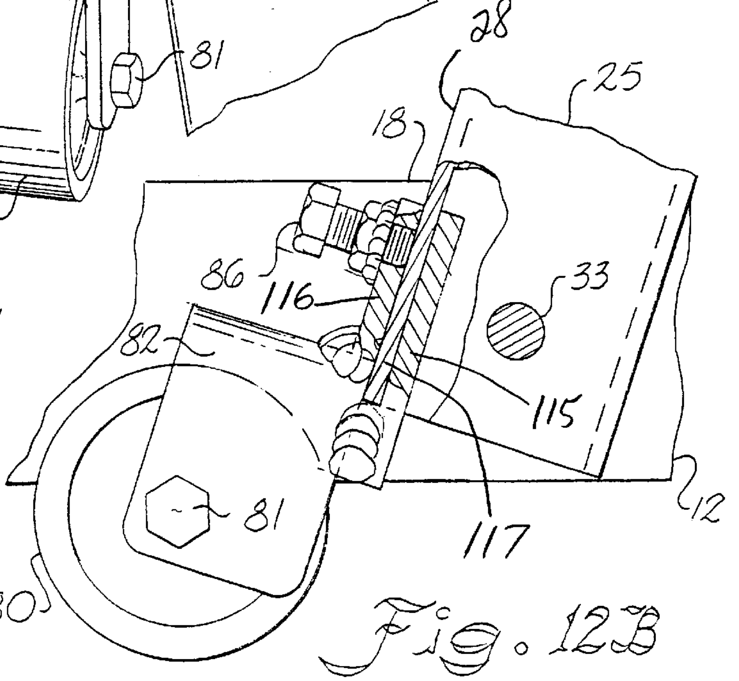
Figure 12C:
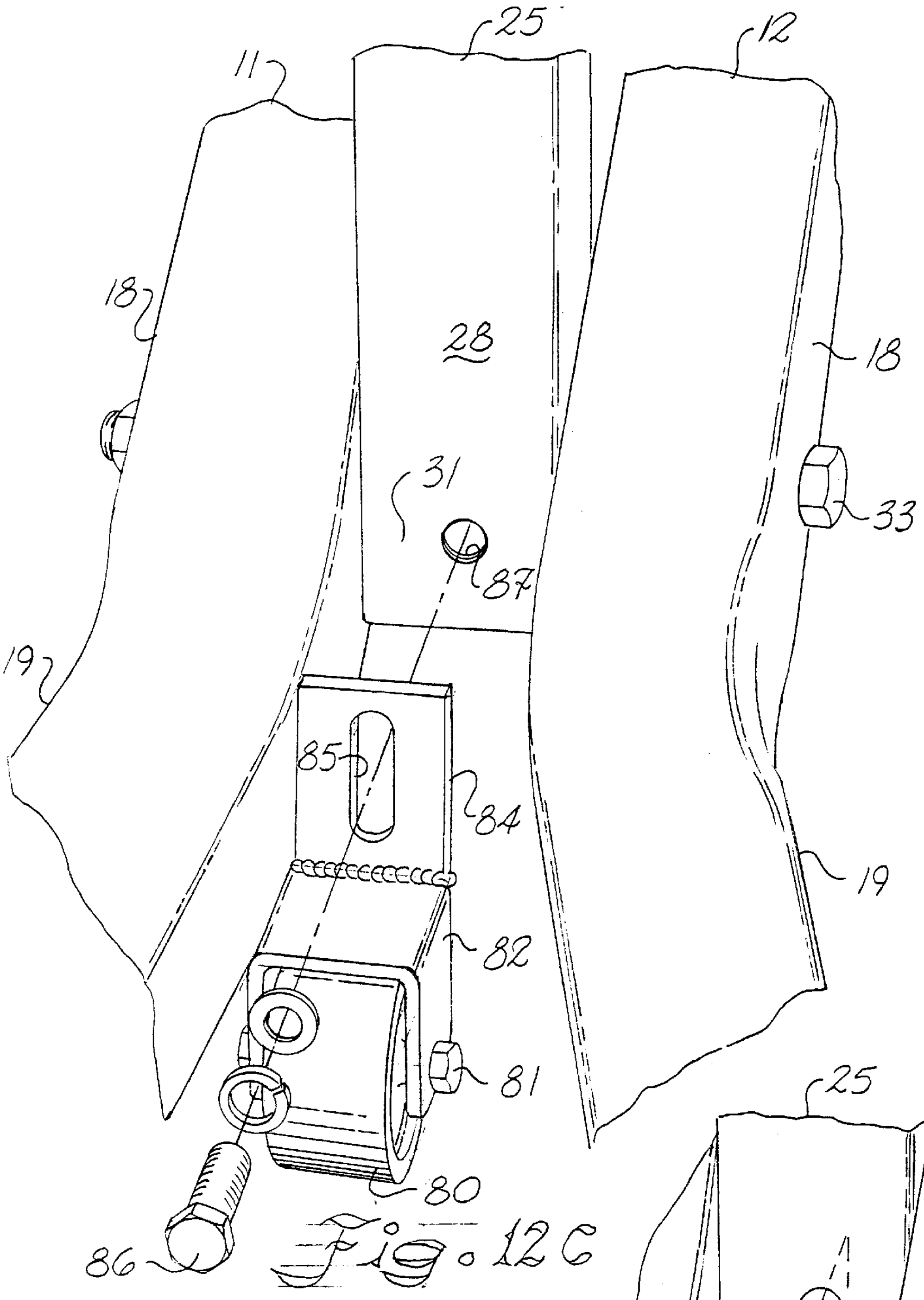
Figure 12D:
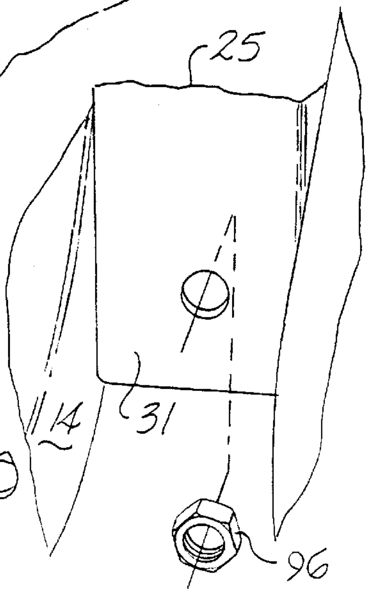
Figure 13:
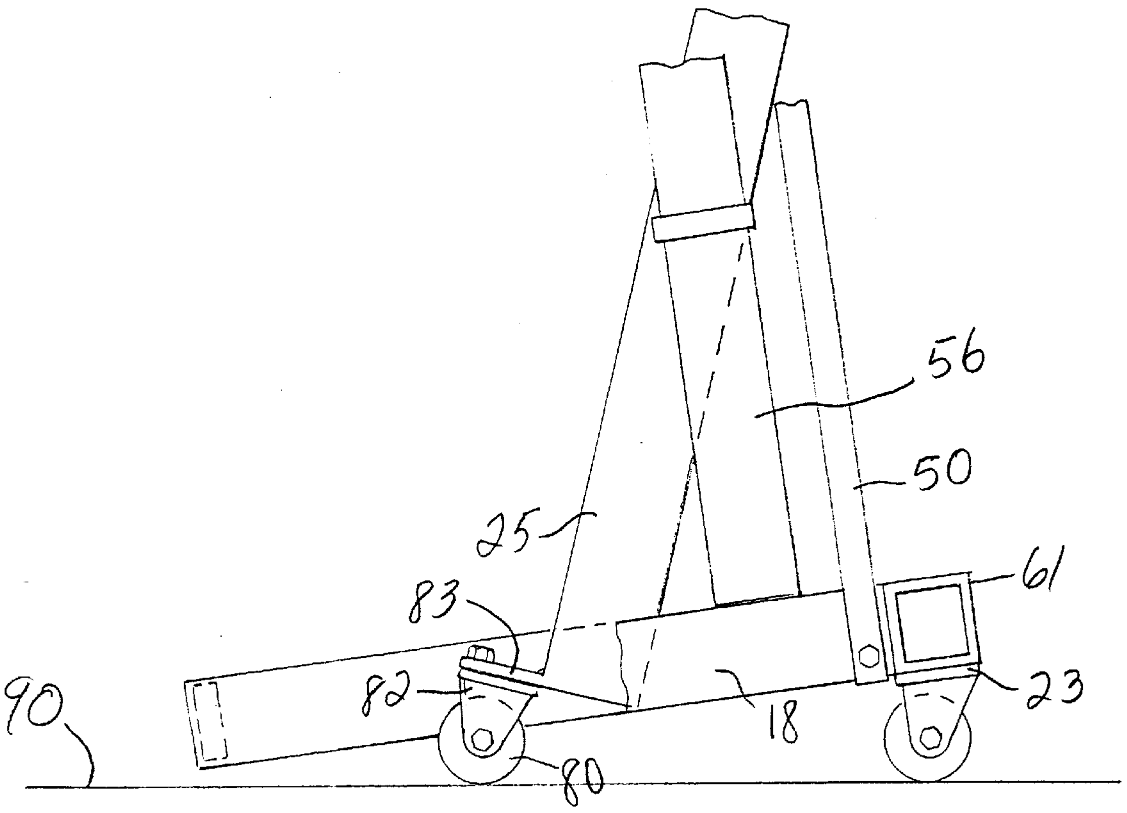
Figure 14A:
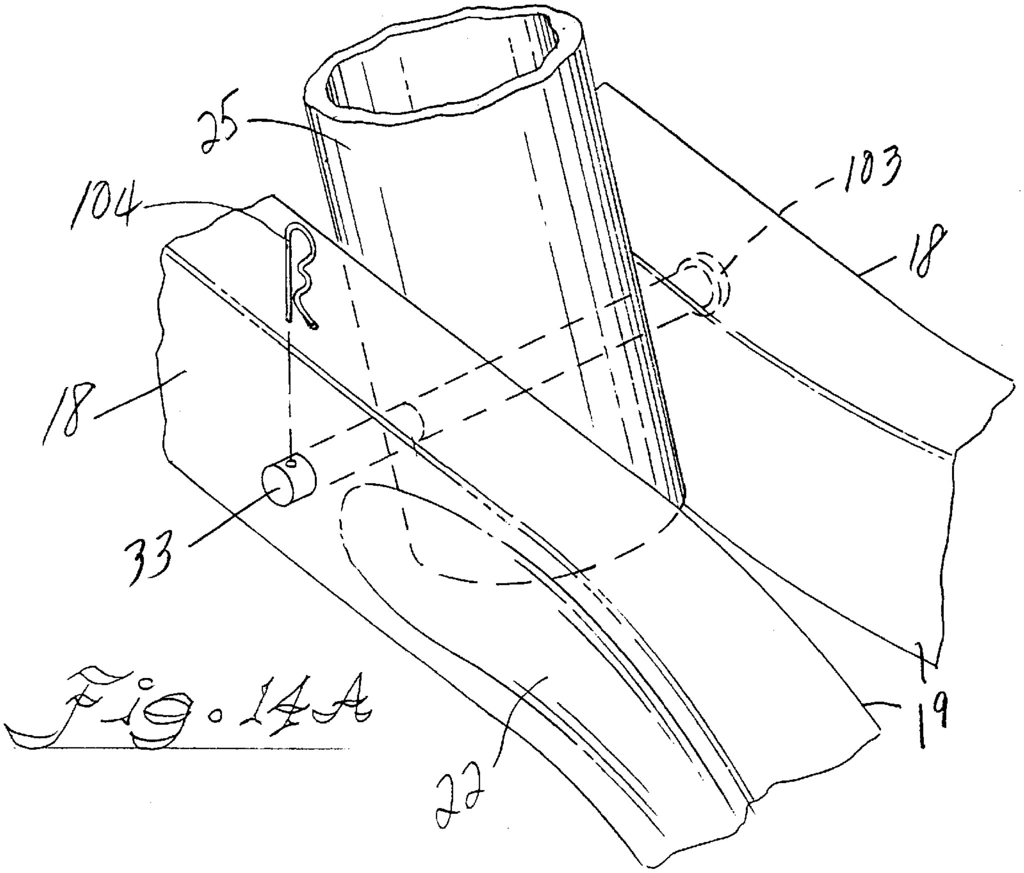
Figure 14B:
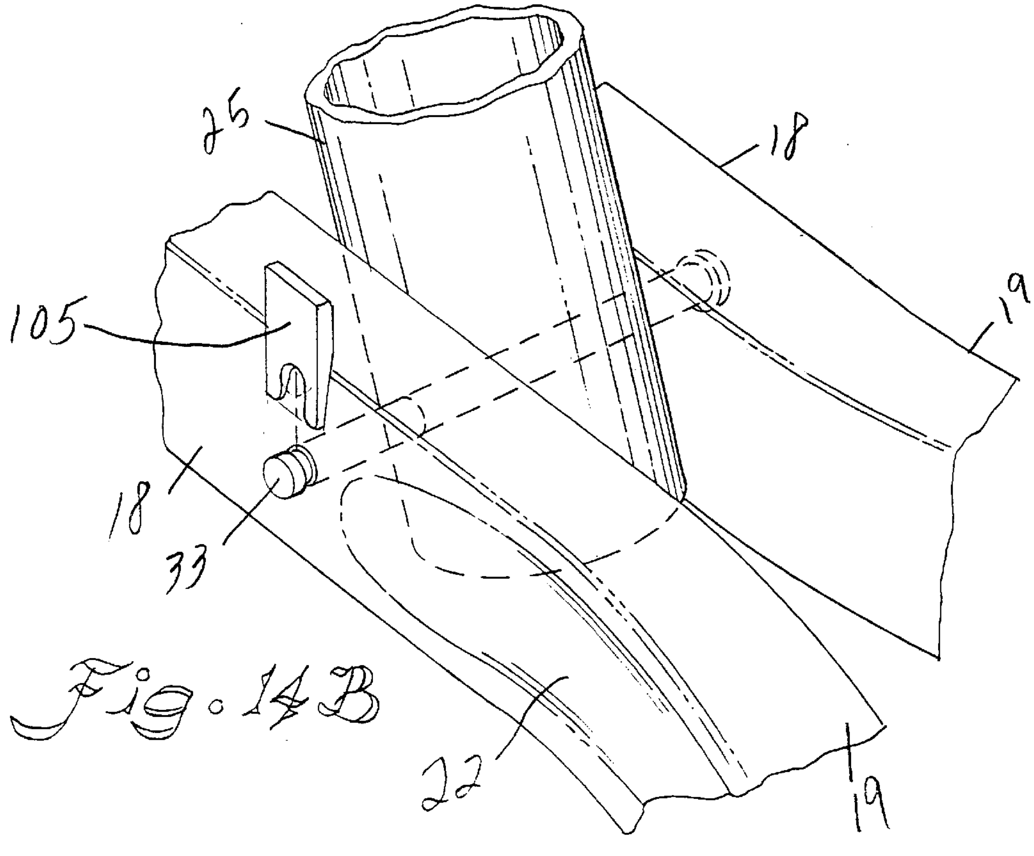
Figure 14C:
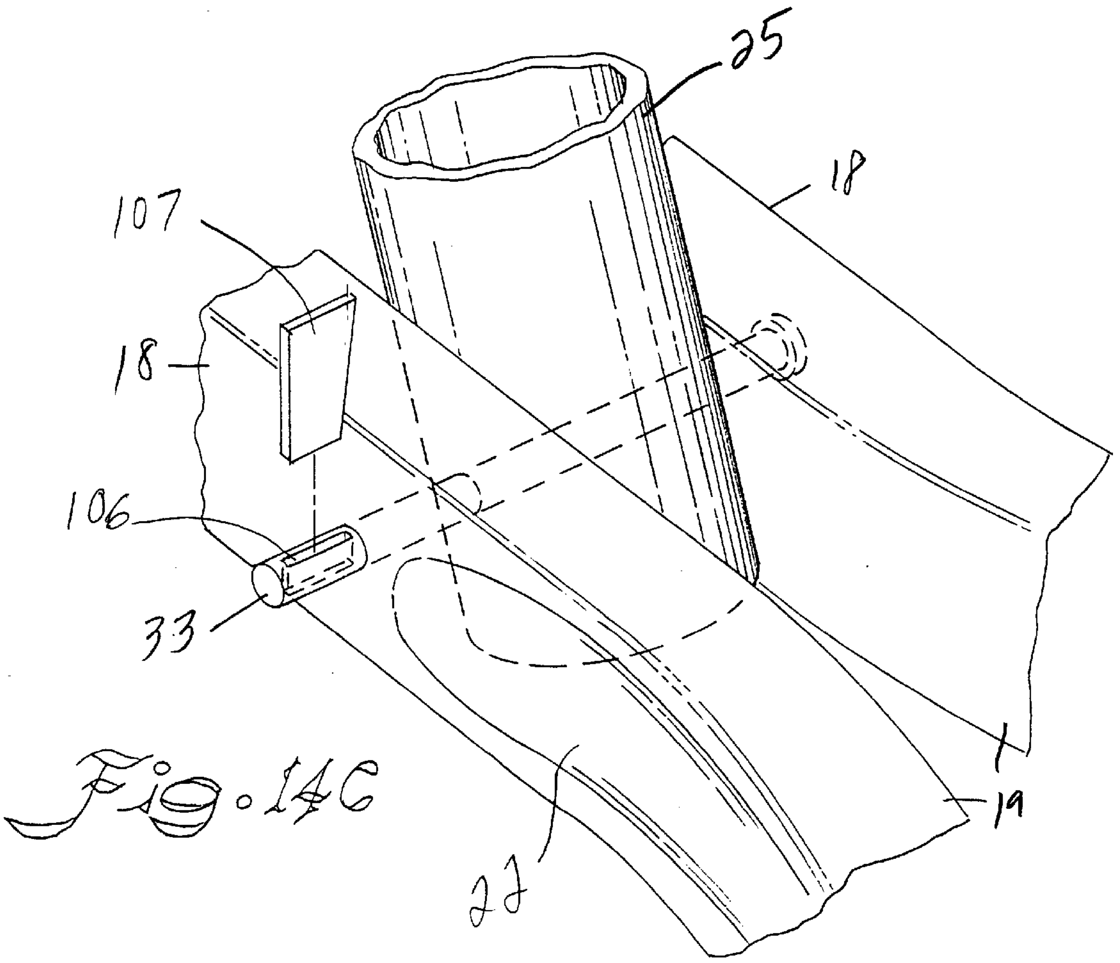
Figure 15A:
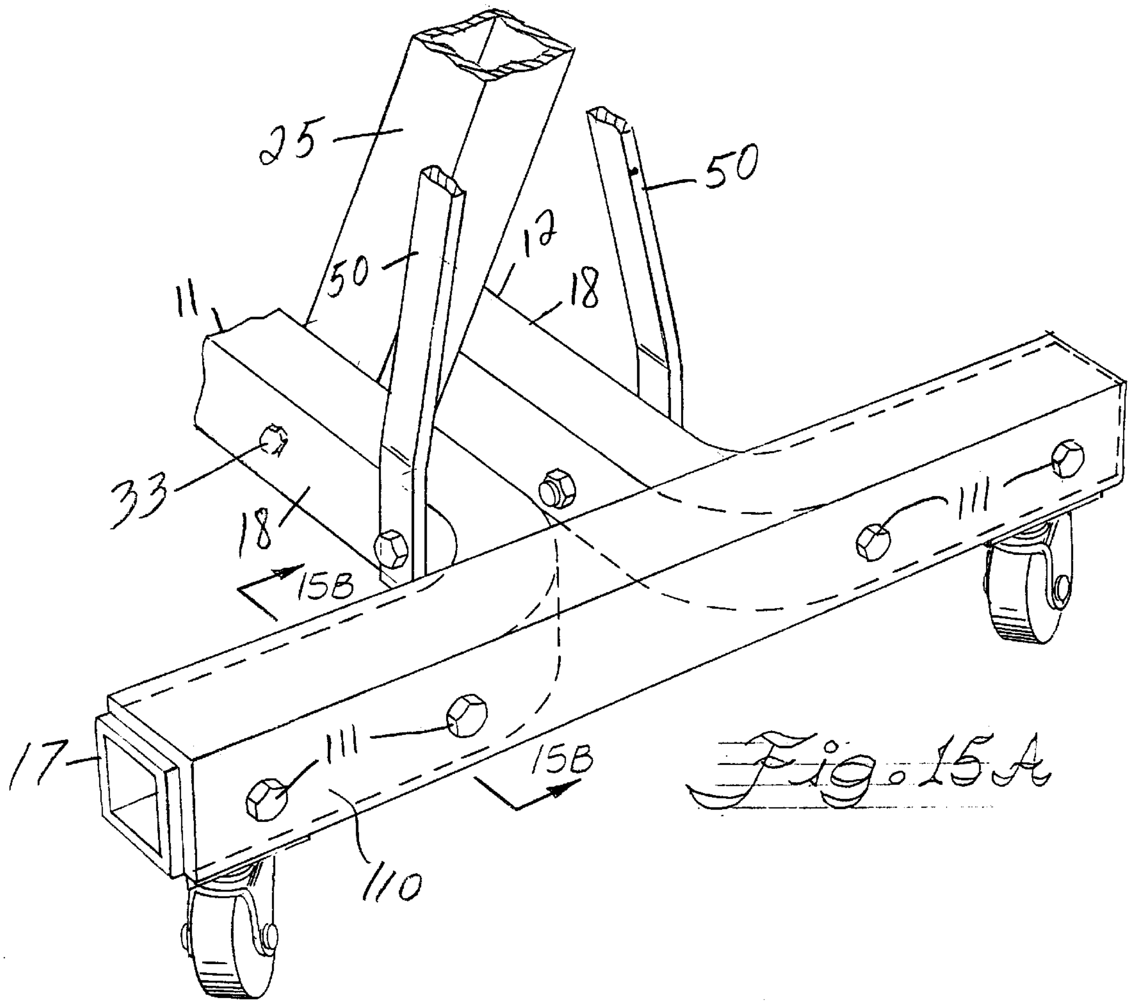
Figure 15B:
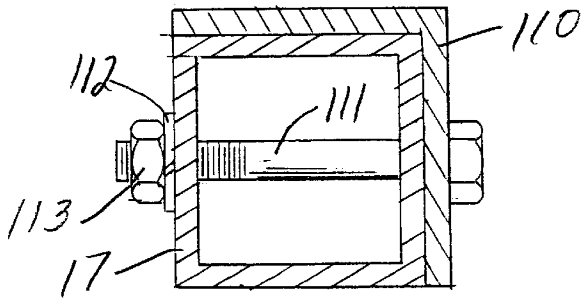

Each of FIGS. 6A, 6B, 6C and 6D is a perspective view go of an alternative embodiment of a component of the present invention shown in FIGS. 1A, 1B, 2A, 3A, 4A, 4D and 5A;

FIG. 7 is a view similar to that of FIG. 5C, but of a different embodiment of the present invention;

FIGS. 8 and 9 are elevated perspective partial views of still another presently preferred embodiment of a mobile lifting device according to the present invention and similar to the embodiment shown in FIGS. 4A and 4B;

FIG. 10 is an elevated perspective partial view of some of the components of a mobile lifting device according to the present invention;

FIG. 11 is an elevated perspective partial view of some of the components of a mobile lifting device according to the present invention taken from a perspective like that of the direction of the arrows designated 11—11 in FIG. 8;

FIGS. 12A, 12C and 12D are elevated perspective partial views of some of the components of a mobile lifting device according to the present invention;

FIG. 12B is a view of the components shown in FIG. 12A but from a view that is partially in cross-section and partially a side plan view;

FIG. 13 is a side plan partial view of some of the components of a mobile lifting device according to the present invention taken from a perspective like that of the direction of the arrows designated 13—13 in FIG. 9;

FIGS. 14A, 14B and 14C are elevated perspective views (with hidden features shown in dashed line) of some of the components of a mobile lifting device according to the present invention;

FIG. 15A is an elevated perspective partial views of some of the components of a mobile lifting device according to the present invention; and FIG. 15B is a cross-sectional view of the components shown in FIG. 15A taken along the line of sight indicated by the arrows designated 15—15 in FIG. 15A.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1A:
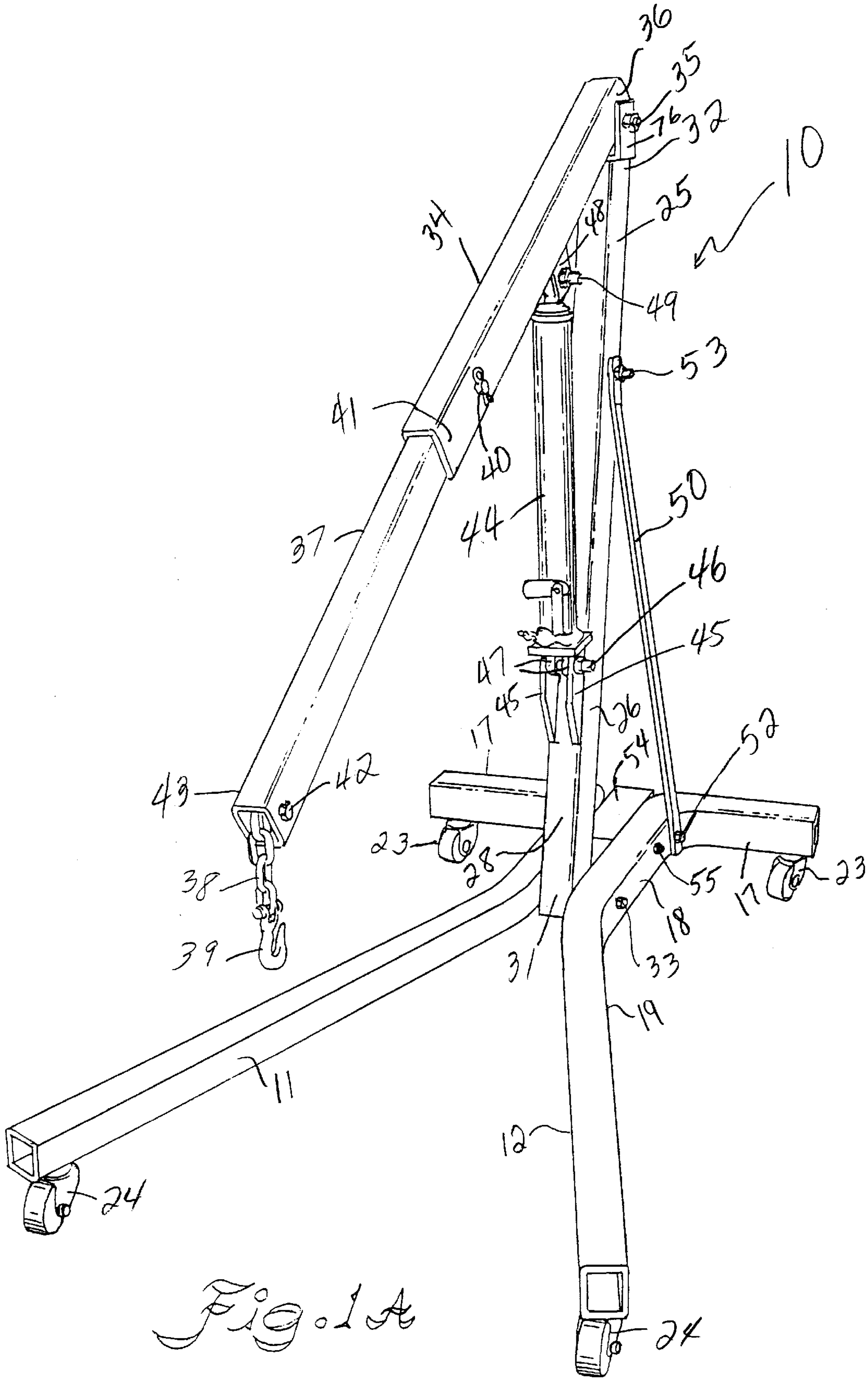
FIG. 1A is an elevated perspective view of a mobile lifting device according to one alternative embodiment of the present invention.
Figure 2A:
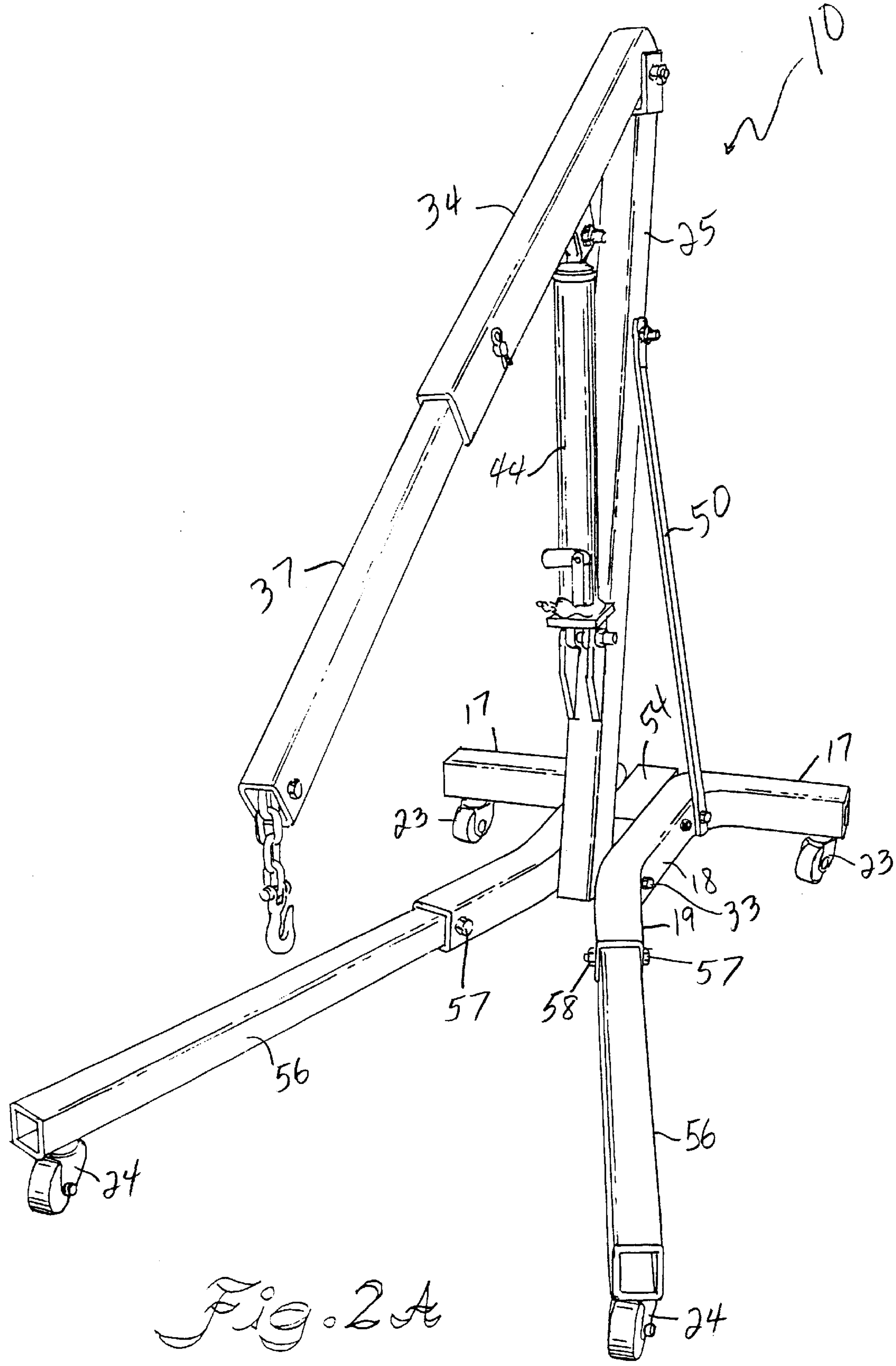
FIG. 2A is an elevated perspective view of a mobile lifting device according to another alternative embodiment of the present invention.

One presently preferred embodiment of the mobile lifting device of the present invention is shown in FIG. 4A as a crane that is designated generally by the numeral 100. Another presently preferred embodiment of the mobile lifting device of the present invention is shown in FIG. 8 as a crane that is designated generally by the numeral 101. An alternative embodiment of the mobile lifting device of the present invention is shown in FIG. 1A as a crane that is designated generally by the numeral 10. Another alternative embodiment of the mobile lifting device of the present invention is shown in FIG. 2A as a crane that is also generally designated by the numeral 10.

Figure 1B:
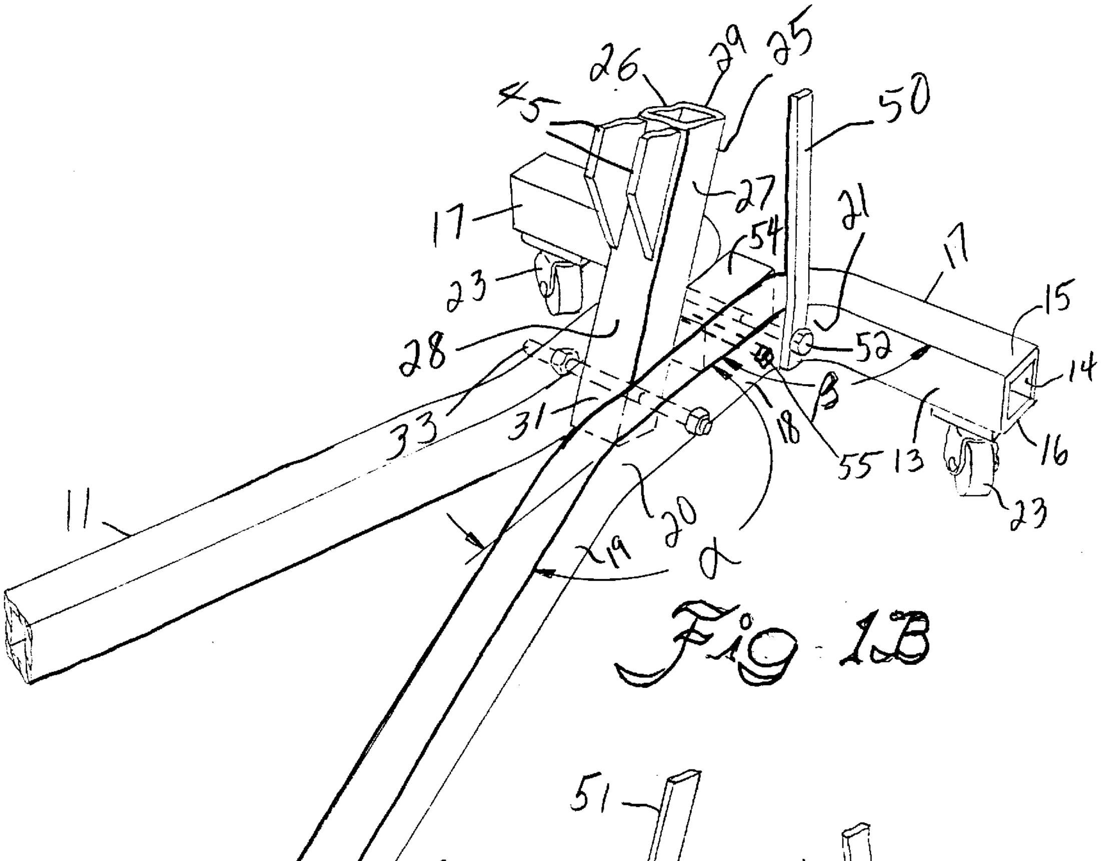
FIG. 1B is an elevated perspective partial view of the device shown in FIG. 1A.

As shown in FIGS. 4A and 1A, crane 100, 10, respectively, includes a right leg 11 and a left leg 12 that is disposed opposite right leg 11. As shown in FIGS. 4B and 1B, each leg is formed of a rigid material such as steel. While each leg can be formed of a length of L-bar (having an L-shaped transverse cross section) or C-channel steel (having a C-shaped transverse cross section), each leg desirably has a tubular configuration that is hollow inside, as this configuration provides the desired strength. Moreover, the transverse cross-sectional shape of the tubular rigid material can be circular or polygonal, such as square, rectangular, hexagonal, etc.

In a rectangular transverse cross-sectional shape shown in FIGS. 4B and 1B for example, the tubular configuration of each leg includes a pair of opposed side panels 13, 14 and a top panel 15 and a bottom panel 16, all of the panels being formed as a unitary tubular structure. The material forming each leg desirably is rolled, low carbon steel, and the gauge of steel and the width and depth of the rectangular cross-section depends upon the desired lifting capacity of the crane. For example, if the crane is to have a lifting capacity of two (2) tons, three inch by three inch rectangular cross-section eight (8) gauge steel is desired for forming each leg. The configuration of the crane for a given lifting capacity depends on the length of the legs, the cross-section of the tubing used to form the legs, the location of the load, and the length of the boom (described below).

As shown in FIGS. 4B and 1B, each leg has a distinctive overall general configuration. Thus, each leg includes a rear portion 17, a forward portion 19 and a mid portion 18 that is disposed between rear portion 17 and forward portion 19. Each of said rear portion 17, mid portion 18 and forward portion 19 defines a separate elongated straight section of the leg.

In the presently preferred embodiments shown in FIGS. 4A, 4B, 8 and 9, the crane includes an undercarriage that includes the provision of a unitary member 61 that forms the rear portions 17 of both legs and provides for the permanent joining of both legs 11, 12 in a single integral structure. Thus, each leg has a unitary tubular member composed of the forward portion 19 and the mid portion 18. Moreover, the mid portions 18 of both the left and right legs are permanently attached to the unitary tubular member 61 that functions as the rear portions 17 of both legs. As shown in FIGS. 8, 9, 4A and 4E for example, the permanent attachment of the mid portions 18 of both legs to the unitary back portion member 61 can be effected as by welding a seam 62. The material forming unitary tubular member 61 desirably is rolled, low carbon steel, and the gauge of steel and the width and depth of the rectangular cross-section depends upon the desired lifting capacity of the crane. For example, if the crane is to have a lifting capacity of two (2) tons, three inch by three inch rectangular cross-section eleven (11) gauge steel is desired for forming unitary tubular member 61.

In an alternative embodiment shown in FIGS. 1A and 1B, a spacer member 54 desirably is formed as an abbreviated length of the same rigid tubular member that is used to form legs 11, 12 and can be disposed between left leg 12 and right leg 11. Spacer member 54 can be partially fastened between left leg 12 and right leg 11 by a fastening bolt 52.

Another attachment bolt 55 can be provided through the opposite end of the spacer member 54 and through the mid portion 18 of each leg at a location spaced along the length of the mid portion 18 and between the location where the fastening bolt 52 is connected and where the stanchion 25 (described below) is connected to the leg. The fastening bolts 52, 55 can be fastened by threaded nuts and places the bolts 52, 55 under tension and the legs 11, 12 and spacer member 54 under compression. Thus, the undercarriage of the embodiment of FIGS. 1A and 2A includes both legs 11, 12 and the spacer member 54 connected together.

In an alternative embodiment shown in FIGS. 15A and 15B for example, a back brace 110 that can be configured from a right angle plate can be fitted over the rear face and top face of the rear portions 17 of the legs 11, 12. Back brace 110 can be configured as a length of L-bar (having an L-shaped transverse cross section) as shown in FIG. 15B for example. Alternatively, the right angle plate forming back brace 110 can be configured as a C-channel steel bar that overlaps three sides of the rear portions 17 of the legs 11, 12 and leaves a cut out for accommodating where mid portions 18 of the legs meet the rear portions 17. As shown in FIG. 15B for example, a plurality of fasteners such as bolts 111, washers 112 and threaded nuts 113 are provided to firmly attach back brace 110 to the rear portions 17 of legs 11, 12. In this alternative embodiment, it is possible to dispense with spacer member 54. Additionally, a similar back brace 110 can be used with an embodiment such as shown in FIG. 5C for example.

Figure 2B:
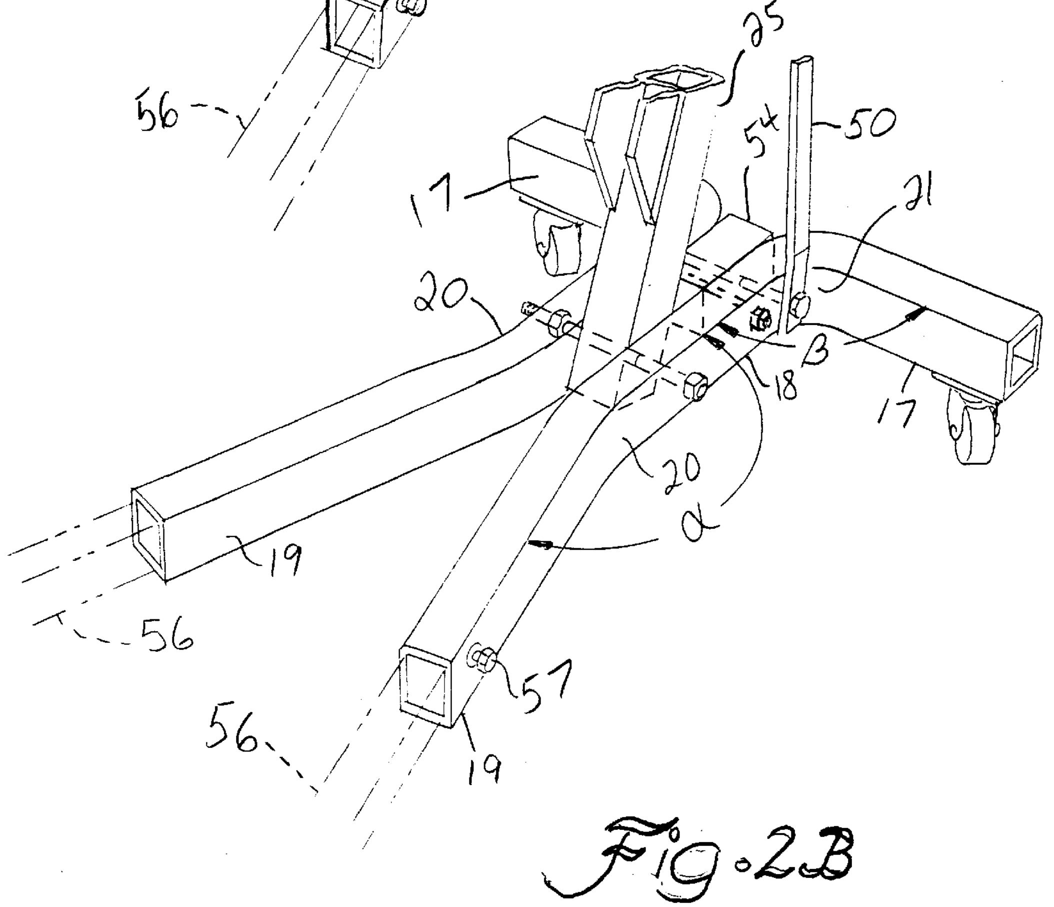
FIG. 2B is an elevated perspective partial view of the device shown in FIG. 2A.

As shown in FIGS. 4B, 9, 1B and 2B for example, the mid portion 18 and forward portion 19 are formed as a unitary tubular member. As shown in FIGS. 1A, 1B, 2A and 2B, the rear portion 17, mid portion 18 and forward portion 19 are formed as a unitary tubular member. As shown in FIGS. 4B, 9, 1B and 2B for example, a first bend 20 forms the vertex of an obtuse angle Alpha ($\alpha$) disposed between mid portion 18 and forward portion 19 of each leg. The first bend 20 desirably can define an angle Alpha ($\alpha$) that is in the range of 135° to 170°, but other angles are possible depending upon the desired application for the crane. As shown in FIGS. 4B, 9, 1B and 2B for example, a second bend 21 forms the vertex of a right angle Beta ($\beta$) where the mid portion 18 joins the rear portion 17 of each leg. As shown in FIGS. 1B and 2B for example, spacer member 54 is located between the ends of the mid portions 18 of the legs that is closest to where second bend 21 forms the vertex of a right angle Beta ($\beta$) where each mid portion 18 joins the rear portion 17 of each leg.

The angle formed by first bend 20 will contribute to determining the footprint of the crane as it rests on or is moved across the floor. In some cases a wider footprint is desirable depending upon the intended purpose of the crane. In most cases, a narrower footprint is more desirable so long as the included angle defined between the forward portions 19 of the legs is large enough to dispose the legs outside of the footprint of the load that the crane is intended to lift. A typical angle for first bend 20 would be 167.50 so that the so-called included angle between the two legs 11, 12 as they were laid side-by-side would be 25°. The legs are desirably provided with an included angle such that the legs are disposed sufficiently outside of the center of gravity of the intended load to be lifted by the boom so as to provide a comfortable margin of safety for anticipated sideways movement of the load.

As shown in FIG. 4B for example, the bending that forms first bend 20 typically causes formation of an elongated indentation 22 in side panel 13 of the leg. This indentation 22 is formed so that it extends into part of mid portion 18 and part of forward portion 19 of each outwardly facing side panel 13 of each leg 11 or 12.

Similarly, as shown in FIG. 1B, a second bend 21 defines the vertex of a right angle Beta ($\beta$) that forms the vertex connecting the mid portion 18 and rear portion 17 of each leg. Though not shown in the Figs., an indentation similar to indentation 22 shown in FIG. 4B forms where second bend 21 defines the vertex of the right angle between rear portions 17 and mid portions 18 of each leg 11, 12.

As shown in FIGS. 4A, 8, 1A and 1B, a rolling member such as a caster 23 desirably is provided beneath each free end of the rear portion 17 of each leg in order to assist in rendering the crane mobile. As shown in FIGS. 1A and 1B for example, another rolling member such as a caster 24 can be disposed at the free end of the forward portion 19 of each leg 11, 12 to support the leg and assist in providing mobility for the crane.

In the presently preferred embodiments shown in FIGS. 4A and 8 for example, neither the left leg nor the right leg is formed as a unitary structure as in the embodiment shown in FIGS. 1A and 1B. Moreover, each leg 11, 12 includes a leg extension member 56 that is removably connected to the free end of forward portion 19 by a telescoping connection. One end of leg extension member 56 and the forward-most end of forward portion 19 of each leg 11, 12 can be configured so that one is insertable into and nests within the other. In the embodiment shown in FIG. 4A for example, leg extension member 56 is configured so as to be insertable into the forward-most end of forward portion 19 of each leg 11, 12, and this is the presently preferred configuration. The material forming each leg extension member 56 desirably is rolled, low carbon steel, and the gauge of steel and the width and depth of the rectangular cross-section depends upon the desired lifting capacity of the crane. For example, if the crane is to have a lifting capacity of two (2) tons, two and one half inch by two and one half inch rectangular cross-section eleven (11) gauge steel is desired for forming each leg extension member 56. As shown in FIG. 4A for example, leg extension member 56 is connected to forward portion 19 by a threaded attachment bolt 57 that is inserted transversely through forward portion 19 and leg extension member 56. Threaded bolt 57 can be inserted from either side panel 13 or 14 of the leg 11, 12. Moreover, the caster 24 at the free end of the forward portion 19 of each leg is provided on the free end of the leg extension member 56 as shown in FIG. 4A. In an alternative embodiment, leg extension member 56 and the forward-most end of forward portion 19 of each leg 11, 12 can be configured so that the forward-most end of forward portion 19 of each leg 11, 12 is insertable into and nests within one end of leg extension member 56.

One advantage of the embodiments of FIGS. 4A and 8 over the embodiment of FIGS. 1A and 1B is the possibility of reducing the length of the shipping carton. Each leg 11, 12 can be disassembled into two smaller components in the embodiments of FIGS. 4A and 8. Moreover, the provision of a series of holes along the length of each forward portion 19 of each leg renders the length of each leg adjustable in the embodiments of FIGS. 4A and 8.

As shown in FIGS. 6A, 6B, 6C and 6D for example, casters 23, 24 can be replaced in some embodiments by other means of rendering the crane mobile such as wheels 68 mounted on axles 69. For example, as shown in FIG. 9, a plate 72 can be welded to a mount 73 for an axle 69 and wheel 68 arrangement, and plate 72 can be welded against the bottom surface of the end of leg extension members 56 or the ends of legs 18, 19. Notice that plate 72 and mount 73 are welded so that the plane in which wheel 68 rotates is disposed at an angle with respect to the length of extension member 56 so that this rotational plane of wheel 68 is parallel to the plane defined by the boom and stanchion of the crane in order to facilitate steering during movement of the crane.

Figure 6B:
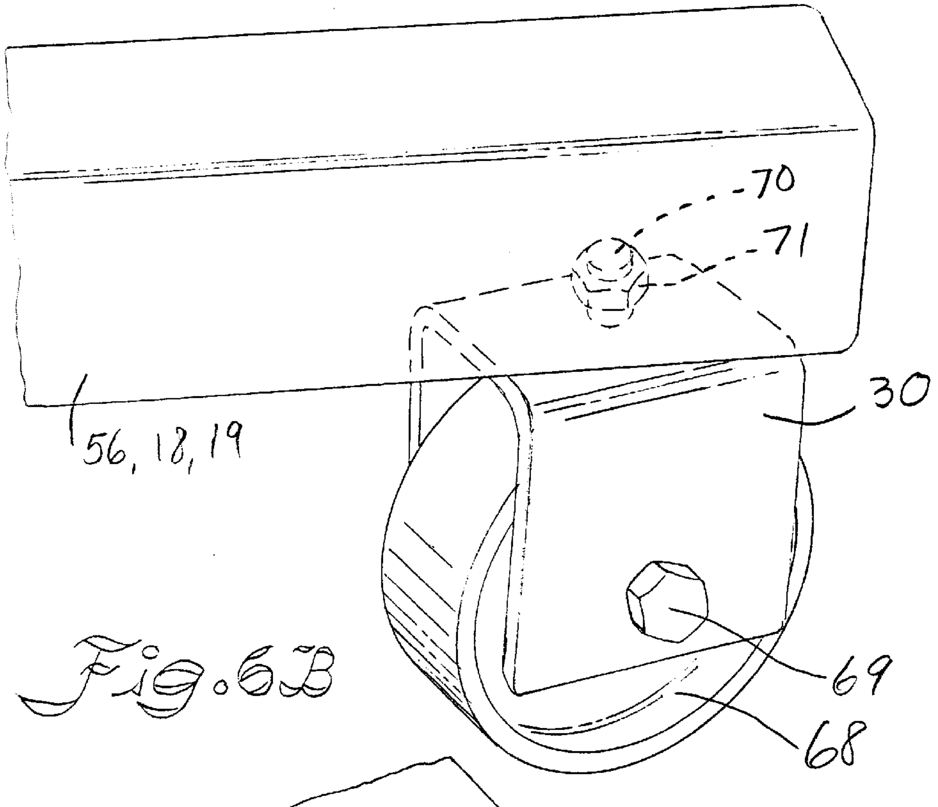
Figure 6C:
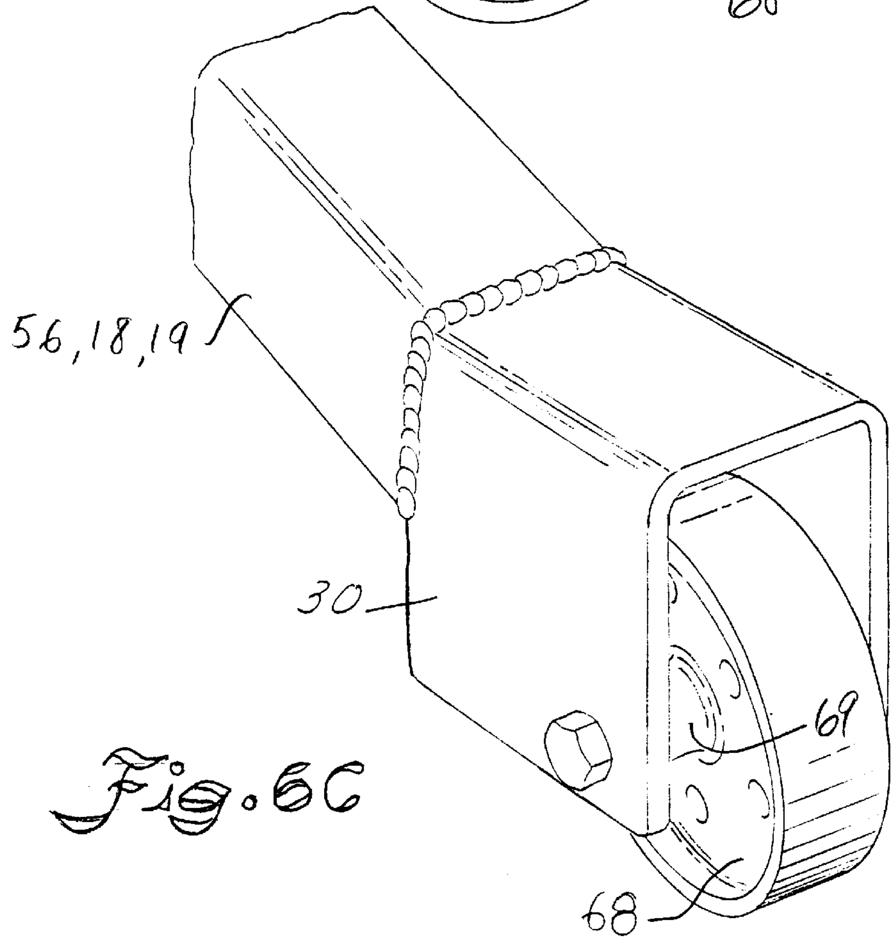
Figure 6D:
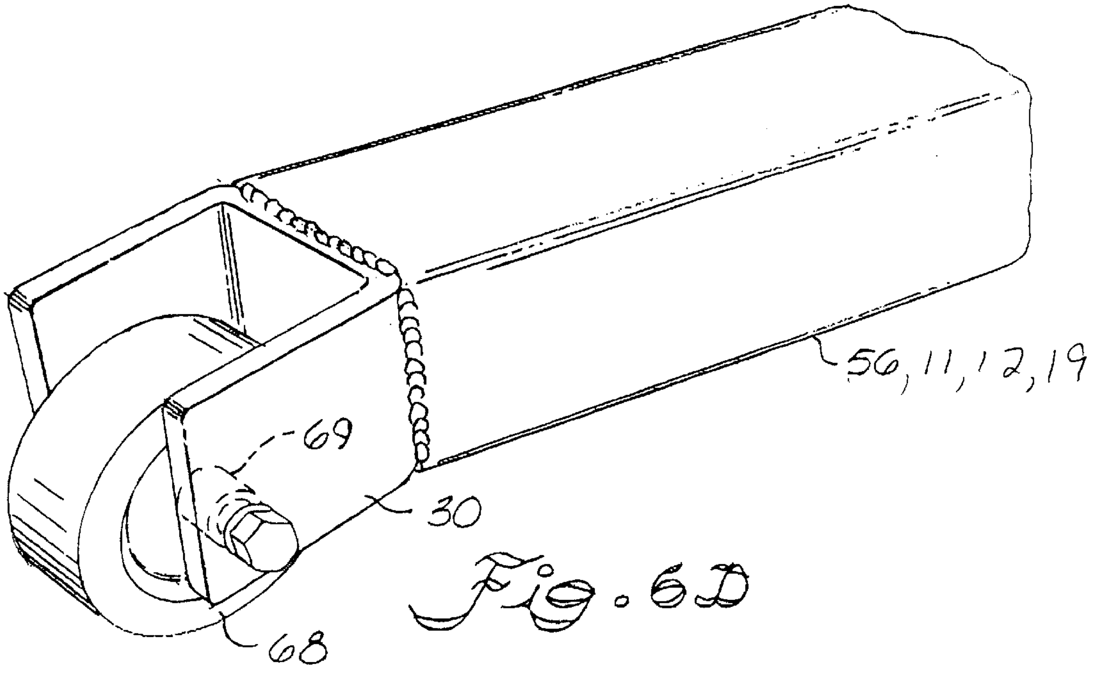

As shown in FIGS. 6B, 6C and 6D, additional fixed wheel and axle configurations can be provided on the end of leg extension members 56 or the ends of the legs 18, 19 themselves, depending on the embodiment. As shown in FIG. 6B, a wheel 68 mounted on an axle 69 disposed between the two side arms of a section of a C-channel member 30 can be attached as by a threaded bolt 70 and nut 71 onto the end of extension members 56 or on the ends of legs 18, 19. Alternatively, the C-channel wheel and axle arrangement can be welded with the base of the C-channel welded against the bottom surface of the end of leg extension members 56 or the ends of legs 18, 19. As shown in FIG. 6C, a section of a C-channel member 30 can be welded on the end of extension members 56 or on the ends of legs 18, 19 in an orientation that is configured to form a hooded wheel 68 mounted on an axle 69 disposed between the two side arms of C-channel member 30. As shown in FIG. 6D, the base of a section 30 of a C-channel is permanently attached to each of the free ends of the front portions 19 of the legs 11, 12 (or leg extensions 56). Wheels 68 are mounted on axles 69 mounted between the arms of the section 30 of the C-channel. In such an embodiment, casters 23 (not shown in the FIG. 6D view) are provided beneath the free ends of rear portions 17 so that steering of the crane is facilitated. As in the FIG. 9 embodiment, the rotational plane of wheel 68 is disposed parallel to the plane defined by the boom and stanchion of the crane.

As shown in FIGS. 1A, 4A, 8 and 10 for example, a stanchion 25 is provided and desirably is also formed of tubular rigid material that desirably is the same as provided for the legs and spacer member 54. The material forming the stanchion 25 desirably is rolled, low carbon steel, and the gauge of steel and the width and depth of the rectangular cross-section depends upon the desired lifting capacity of the crane. For example, if the crane is to have a lifting capacity of two (2) tons, three inch by four inch rectangular cross-section eleven (11) gauge steel is desired for forming stanchion 25. However, the stanchion can be formed of the same alternative materials noted above for forming the legs.

As shown in FIG. 10, the stanchion also can include a pair of opposed side panels 26, 27 (only one being visible in FIG. 1A), a front panel 28 and a back panel 29 (FIG. 10). All of the panels forming the tubular member that composes the stanchion 25 are desirably part of a unitary tubular member having a rectangular and preferably a square transverse cross-sectional shape. However, the tubular member that composes the stanchion 25 also can have different transverse cross-sectional shapes that can be polygonal or circular as shown in FIGS. 14A, 14B, and 14C for example.

As shown in FIGS. 4A, 1A, 1B, 2A and 8 for example, stanchion 25 is disposed symmetrically between and above right leg 11 and left leg 12. Further, stanchion 25 has a base end 31 shown in FIGS. 11, 1A and 1B for example. And as shown in FIGS. 1A and 10 for example, stanchion 25 has a top end 32, which is located generally opposite base end 31.

In accordance with the present invention and as shown in FIG. 4B for example, a support member 33 is disposed to extend transversely through both of the side panels 13, 14 of each of the right leg 11 and the left leg 12 and through both of the side panels 26, 27 of the base end 31 of stanchion 25. The diameter of support member 33 can be varied depending upon the desired lifting capacity of the crane and the grade of steel. For example, for a lifting capacity of 2 tons, support member 33 can be ¾ inches in diameter and formed of carbon alloy steel of at least ASTM grade 5, and desirably ASTM grade 8 carbon alloy steel. However, the larger the diameter of support member 33, the lower the grade of steel that can be used to form member 33.

Support member 33 can take many forms, including a form Do that permits the legs and stanchion to be placed under tension or not, as desired. However, it is preferable for the support member 33 to facilitate the tightening of the legs and stanchion to be placed under tension. This can be accomplished if the support member 33 takes the form of a bolt with a head on one end and threaded on the other end so as to receive a threaded nut as shown in FIGS. 8 and 11 for example. In an alternative tensioning configuration, support member 33 can be formed as a bolt that can be fastened in place on its opposite ends by threaded nuts and in a manner similar to that shown in FIG. 4B for example wherein the surfaces of inwardly-facing side panels 14 of the legs 11, 12 are contacting the opposed surfaces of the respective side panels 27, 26 of the base end 31 of the stanchion 25. When support member 33 fastens base end 31 of stanchion 25 to the mid portions 18 of the legs 11, 12, member 33 is under tension, and the base end 31 of stanchion and the mid portions 18 of the legs 11, 12 are under compression. The manner of attachment of stanchion 25 to right leg 11 and left leg 12 in the embodiment of FIG. 4B is the same as shown in FIGS. 1A, 1B, 2A, 2B, 3A, 3B, 4A, 4C, 4D, 9, 12A and 13 for those related embodiments.

Alternative support members 33 can be provided that do not place the legs and stanchion under tension, but prevent them from separating more than a predetermined distance from one another. As shown in FIG. 14A, such alternative support members 33 can include a shaft with a head 103 on one end and a clevis pin or cotter pin 104 on the opposite end. As shown in FIG. 14B, a rod or straight bar can be provided with a side retainer 105 on at least one end and/or on each opposite end. As shown in FIG. 14C, a bolt having on at least one end a slot 106 configured to receive a wedge 107 is another form that the support member 33 can take.

Figure 4E:
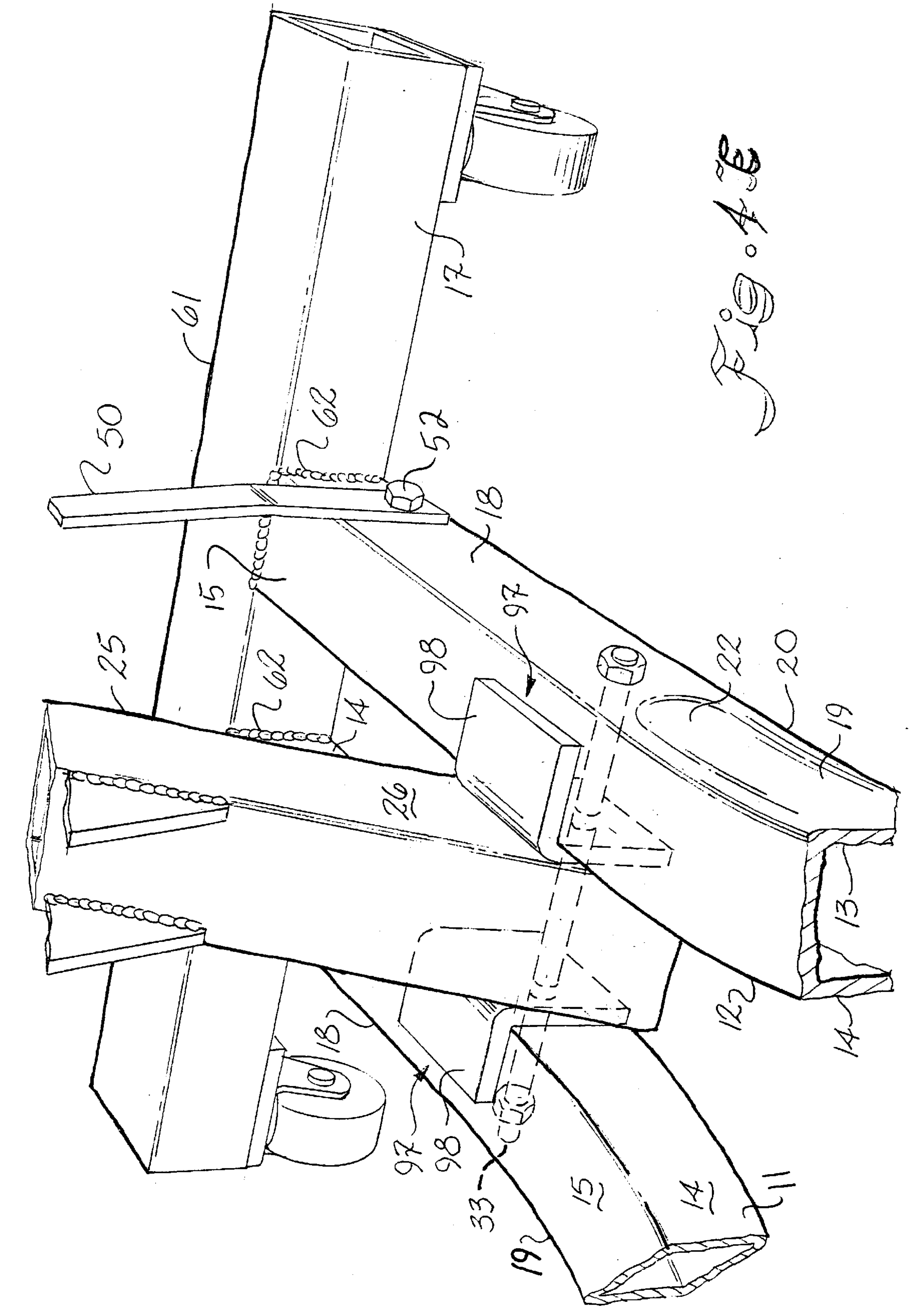
FIG. 4E is a view similar to that of FIG. 4B, but of a different embodiment of the present invention.

In an alternative embodiment shown in FIG. 4E, the manner of attachment of stanchion 25 to right leg 11 and left leg 12 differs from the embodiment of FIG. 4A for example insofar as the provision of at least one of a pair of shims 97. Each shim 97 has a main body that is configured to be interposed between one of the side panels 26 or 27 of stanchion 25 and the inwardly-facing side panel 14 of the corresponding mid portion 18 of each leg 11, 12. When the mid portions 18 are permanently attached to unitary tubular member 61 with a standardized spacing between the mid portions 18, each shim 97 facilitates the use of stanchions 25 of different widths in combination with an undercarriage composed of the mid portions 18 and the unitary tubular member 61 that forms the rear portions 17 of both legs 11, 12 and provides for the permanent joining of both legs in a single unitary structure. For reasons of symmetry, it is preferable to install two identical shims 97, with one being disposed on each opposite side of stanchion 25. However, it is possible, though not recommended, to use a single shim on only one side of stanchion 25.

As shown in FIG. 4E, each shim 97 can be configured with an L-shaped cross-section such that a lip portion 98 is disposed at a right angle to the main body of shim 97. Lip portion 98 is configured and disposed to rest on the top panel 15 of each leg 11, 12 and facilitates installation of shim 97.

In this configuration shown in FIGS. 1A, 1B, 2A, 2B, 3A, 3B, 4A, 4B, 4C, 4D, 4E, 8, 9, 11, 12A, 12B, 12C, 12D, 14A, 14B, 14C and 15A for example, stanchion 25 is supported at two locations along the length of support member 33. Moreover, the bearing surface contacting each location along the length of support member 33 is determined by the thickness of each side panel 26, 27 of stanchion 25. Support member 33 is in turn supported by two bearing surfaces provided by the side panels 13, 14 of each of the right leg 11 and the left leg 12. The location of the holes drilled transversely through the side panels 13, 14 of each of the left leg 12 and the right leg 11 can be adjusted so that they are more or less close to the top panel 15 forming the mid portion 18 of each leg. The more distance between the holes through the side panels 13, 14 and the bottom panel 16 of the mid portion 18 of each leg, the more metal that is disposed beneath the bearing surface provided by each side panel 13, 14 of each leg and the more weight bearing capacity is believed to be provided by each leg. Moreover, the width of stanchion 25 automatically determines the separation between the mid portions 18 of the left leg 12 and the right leg 11 in the assembly shown in FIGS. 1A, 1B, 2A, 2B, 3A, 3B, 4A, 4B, 4C, 4D, 8, 9, 11, 12A, and 12B for examples.

In the configuration shown in FIGS. 1A, 1B, 2A, 2B, 3A, 3B, 4A, 4B, 4C, 4D, 8, 9, 11, 12A, and 12B for example, stanchion 25 is pivotable about the lengthwise axis of support member 33 during assembly of the crane.

As shown in FIGS. 4A and 1A for example, a boom 34 is pivotally connected to stanchion 25 at the top end 32 of stanchion 25 as by a mounting bolt 35 mounted transversely through the opposed side arms of a U-shaped mounting member 76 that has its base portion attached to the top end 32 of stanchion 25. Bolt 35 is also mounted transversely through a back end 36 of boom 34. The material forming the boom 34 desirably is rolled, low carbon steel, and the gauge of steel and the width and depth of the rectangular cross-section depends upon the desired lifting capacity of the crane. For example, if the crane is to have a lifting capacity of two (2) tons, three inch by four inch rectangular cross-section eight (8) gauge steel is desired for forming boom 34.

Moreover, as shown in FIGS. 4A and 1A for example, and as is conventional in the art, boom 34 can have a telescoping member 37, which is provided at the end thereof with a chain 38 and an attachment device such as a hook 39. The material forming the boom's telescoping member 37 desirably is rolled, low carbon steel, and the gauge of steel and the width and depth of the rectangular cross-section depends upon the desired lifting capacity of the crane. For example, if the crane is to have a lifting capacity of two (2) tons, two and one half inch by three and one half inch rectangular cross-section eight (8) gauge steel is desired for forming the boom's telescoping member 37. As shown in FIGS. 4A and 1A for example, a setting bolt 42 is removably disposed transversely of the free end 43 of boom extension 37 and through a link of chain 38, as is conventional in the art. As shown in FIG. 10 for example, telescoping member 37 is locked into a particular position by a locking pin 40 that is removably insertable transversely through the opposed side panels 41 of boom 34 and the nested portion of telescoping boom extension 37 contained within boom 34.

As is conventional, the boom 34 is powered to perform the lifting function as it pivots with respect to stanchion 25. Such lifting force can be provided by a hydraulically operated cylinder such as a lifting ram 44 shown in FIGS. 4A and 1A for example. Lifting ram 44 has a first end, and a second end disposed opposite the first end. Lifting ram 44 includes a conventional hydraulic cylinder member and a piston rod member. The piston rod member defines a rod connected at one end to a piston that is disposed within the cylinder member and thus is not visible in the view shown in FIGS. 4A and 1A. The rod has a free end disposed opposite the end connected to the piston. One end of the cylinder is at one end of the ram 44, and the free end of the piston rod is at the other end of the ram 44. One of the cylinder member and the free end of the rod is pivotally connected to stanchion 25 between the base end 31 and the top end 32 of stanchion 25. As shown in FIGS. 8 and 1A for example, one end of the cylinder member is pivotally connected to stanchion 25 via a pair of mounting plates 45 and a mounting bolt 46 disposed transversely through mounting plates 45 and the mounting flanges 47 of the base of the cylinder member.

The other of the free end of the rod and the cylinder member is pivotally connected to the boom 34. As shown in FIGS. 1A and 10 for example, the free end of the rod is pivotally connected to the boom 34 by a mounting flange 48 and a mounting bolt 49 that is transversely disposed through mounting flange 48 and the free end of the piston rod. As the piston rod moves in and out of the cylinder member, the boom 34 pivots about the back end 36 of the boom 34 and moves up and down with respect to the floor on which the crane is resting.

A pair of support straps 50 is provided to help stabilize the stanchion 25 and keep it centered between the right and left legs. As shown in FIGS. 4A, 4B, 1A and 1B for example, a left support strap 50 defines a rigid member. Each rigid strap member 50 can be formed by flat bar steel measuring one quarter inch thick and one and one half inches wide and having a pair of opposed ends. The left strap 50 has one end connected to the stanchion 25 and the opposite end of the left strap 50 is connected to the left leg 12. As shown in FIGS. 4B and 1B for example, a fastening bolt 52 is fitted transversely through the mid portion 18 of each leg and through one end of each of the left strap and the right strap (not visible in FIGS. 4B and 1B) and fastened thereto. As shown in FIGS. 4A and 1A for example, the other end of each strap 50 is connected to the stanchion 25 by a fastening bolt 53 threaded transversely through stanchion 25 and through each of the left and right straps 50. Though not shown in FIGS. 4A, 4B, 1A and 1B for example, a similar right strap 50 is provided on the opposite side of stanchion 25 and attached to right leg 11 so that the stanchion is held symmetrically between the straps 50 and the legs 11, 12. Each of the fastening bolts 52, 53 for the straps 50, whether through the legs or through the stanchion, can be fastened by threaded nuts and places the bolts 52, 53 under tension and the tubular members, whether stanchion 25, the legs 11, 12 and/or spacer member 54, under compression.

As shown in FIG. 5C for example, the support straps can take other configurations and dispositions on the legs. One end of each support strap 51 can be attached to the outwardly-facing side panel 13 of the rear portion 17 rather than to the outwardly-facing side panel 13 of the mid portion 18 of each leg. Moreover, each support strap 51 can be configured with a 90° twist 59 in order to accommodate this difference in the location of the attachment on each leg. These alternative embodiments of the support straps 51 with their twists 59 and attachment to outwardly-facing side panels 13 of the legs' rear portions 17 or forward-facing side panel of unitary back portion member 61, also can be applied to the other crane embodiments such as those shown in FIGS. 1A, 2A, 3A, 4A, 8 for example.

Because of the unique construction of the mobile lifting device of the present invention, it lends itself to easy disassembly for shipping and easy re-assembly by the end user once the disassembled device is received by the end user. Each of the left leg 12 and the right leg 11 can be disassembled from the stanchion 25, the support straps 50, and the spacer member 54 by removing the four (4) bolts 33, 52, 53, 55 that attach transversely through the side panels 13, 14 of the mid portion 18 of each leg and the side panels 26, 27 of the stanchion 25. Similarly, the casters 24, 23 can be removed from each of the free ends of the forward portions 19 and the rear portions 17 of the legs 11, 12. Each leg can be laid lengthwise in a box in a manner that forms the opposite mirror image of the other leg so that the rear portion 17 of one leg is adjacent the free end of the forward portion 19 of the other leg and the footprint of the two legs so aligned is rectangular. The top end 32 of the stanchion 25 can be disassembled by removing the mounting bolt 35 through the back end 36 of the boom 34, and the boom 34 and the stanchion 25 also can be disassembled from the respective ends of the lifting ram 44. The boom 34, ram 44 and stanchion 25 can be laid lengthwise in the same box with the legs 11, 12 and the support straps 50 or 51. The casters 23, 24 and the spacer member 54 also can be fitted into the box along with the various bolts, nuts and pins. Thus, all of the components can be fitted into a rectangular box that has a relatively shallow depth that approximates the thickness of the tubular members forming the legs and the stanchion for example.

The embodiment of FIGS. 8 and 9 is one of the presently preferred embodiments and resembles another presently preferred embodiment shown in FIG. 4A, but differs primarily in two respects. First, relative to the length of hydraulic a cylinder 44, the length of stanchion 25 is shorter in the embodiment of FIGS. 8 and 9 than in the FIG. 4A embodiment. To permit the boom 34 to be completely collapsed toward stanchion 25 in the storage position of the embodiment of FIGS. 8 and 9, a U-shaped mounting member 76 (FIG. 10) defines a pair of opposed arms 77 extending perpendicularly with respect to a base portion 78, which is attached to the underside panel 79 at one end of boom 34. Holes are drilled through the side panels 26, 27 of stanchion 25, and a bolt 35 is threaded through these holes and through corresponding holes drilled through the arms 77 of U-shaped mounting member 76.

Another accommodation to the relatively shorter length of stanchion 25 in the embodiment of FIGS. 8 and 9 involves mounting flange 48, which is disposed in the mid-portion of boom 34. As shown in FIG. 10 for example, mounting flange 48 is provided with aligned holes through the opposite side arms 74, 75 of mounting flange 48. In the embodiment of FIG. 4A, the central axis of these aligned holes through mounting flange 48 is generally disposed in the middle of the side arms 74, 75 of mounting flange 48. However, in order to accommodate the collapse of boom 34 when the crane assumes the storage position shown in FIG. 9, the central axis of these aligned holes must be disposed toward the end of the side arms 74, 75 of mounting flange 48 that is farthest away from the end on which U-shaped mounting member is 76 is attached.

The second major difference between the presently preferred embodiments in FIG. 8 and FIG. 4A is the former's incorporation of a rolling member on the end of stanchion 25 opposite the end where U-shaped mounting member 76 is pivotally attached. As shown in FIG. 11, this rolling member can be provided in the form of a wheel 80 that is part of a rolling assembly and carried rotationally on an axle 81 mounted between the side arms of a wheel mount 82 that is fixed, as by being welded or bolted or attached by some other fastening means, to the base end 31 of stanchion 25.

As shown in FIG. 11, the wheel assembly can include a mounting plate 83 that is welded to the base end 31 of stanchion 25, and wheel mount 82 is bolted to mounting plate 83. The rolling member is mounted to this plate 83 in a manner so that the rolling member does not touch the floor surface so long as casters 24 (or other forms of mobility such as hooded wheels mounted on axles) are present on the leg extensions 56 on the ends of the legs. Thus, when the crane is in normal use, the rolling member on the base end 31 of the stanchion 25 does not bear any load. However, when telescoping leg extension members 56 are removed from legs 18, 19, the rolling member such as wheel 80 will touch the floor 90 as shown in FIG. 13 for example, and facilitate the movement of the crane for purposes of storage.

In accordance with one aspect of certain embodiments of the present invention, an adjustable attachment mechanism can be provided for attaching the rolling member to the base end 31 of the stanchion 25. The adjustable attachment mechanism can be configured to render the rolling member height adjustable. As shown in FIG. 12A for example, one form of vertically adjustable attachment mechanism can include a pair of opposed attachment flanges 115, 116 forming a slot therebetween. As shown in FIG. 12B for example, the pair of opposed attachment flanges 115, 116 receive a portion 117 of the base end of the stanchion 25 in the slot formed between flanges 115, 116. As shown in FIG. 12A for example, a threaded hole 118 in one of the flanges 115 receives a threaded bolt 86 that can be tightened or loosened as desired to attach and adjust the wheel assembly and the vertical disposition (height off the floor) of the rolling member 80.

As shown in FIG. 12C for example, another form of vertically adjustable attachment mechanism for the rolling member 80 can include a bolt 86 and a slide plate 84 that defines an elongated slot 85. The rolling member 80 can be mounted on slide plate 84, and bolt 86 can be passed through slot 85 to mount the slide plate 84 to the stanchion's front panel 28 at base end 31 of stanchion 25. Because of slot 85, the slide plate 84 can be adjusted to raise and lower the rolling member accordingly. The threaded shaft of bolt 86 can be screwed into a threaded hole 87 defined through the front panel 28 of stanchion 25. Alternatively, as shown for example in FIG. 12D, since stanchion 25 is a hollow tubular member, the hole 87 need not be threaded, and bolt 86 can receive a threaded nut 96 on the threaded end of bolt 86.

Additional differences in the embodiment of FIG. 8 and FIG. 4A include a pair of storage eyelets 88 mounted on each side panel 26, 27 of stanchion 25. Each storage eyelet 88 is configured so as to be able to receive a telescoping leg extension member 56, when member 56 is not attached to one of the portions 18, 19 of legs 11, 12. The storage eyelets 88 provide a convenient place to hold extension members 56 when the crane is being stored during periods of nonuse.

Additionally, as shown in FIG. 10 for example, a channel 89 can be mounted transversely near the upper end of back panel 29 of stanchion 25 and can be configured to slidably receive therein the handle 91 that is used to pump the hydraulic cylinder 44. Thus, this handle 91 serves a dual function of providing leverage to pump the hydraulic cylinder when it is attached to the pumping sleeve 99 as shown in FIG. 8 for example. When handle 91 is removed from the sleeve 99 and is slidably received in the opening defined by channel 89, handle 91 provides leverage to the user who desires to steer the crane into a storage location or to move the crane when it is carrying a load from one location to another location.

The crane of the present invention comprehends a number of alternative embodiments, some of which already have been introduced above. Each alternative embodiment shares like configurations and has some of the same structural components in common with other embodiments. Examples of some of these additional alternative embodiments and different combinations of structural components are now being described.

In the alternative embodiment shown in FIGS. 2A and 2B, neither the left leg nor the right leg is formed as a unitary structure as in the embodiment shown in FIGS. 1A and 1B. In the embodiment of FIGS. 2A and 2B, each leg 11, 12 includes a telescoping leg extension member 56 that is attached to the free end of forward portion 19 as explained above in connection with the embodiments of FIGS. 4A and 8 for example.

One advantage of the embodiment of FIGS. 2A and 2B over the embodiment of FIGS. 1A and 1B is the possibility of reducing the length of the shipping carton. Each leg 11, 12 can be disassembled into two smaller components in the embodiment of FIGS. 2A and 2B. Moreover, the length of each leg is adjustable in the embodiment of FIGS. 2A and 2B.

Figure 3A:
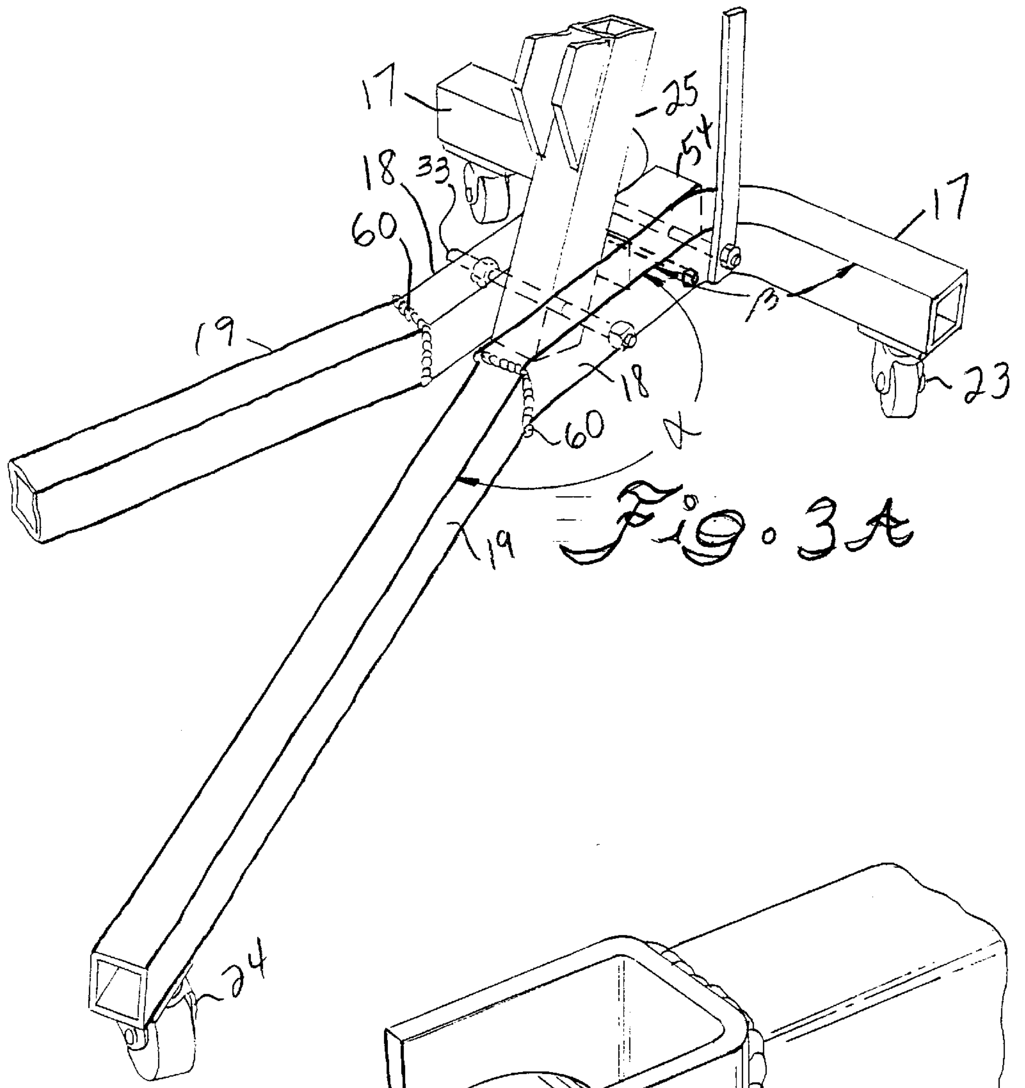
FIG. 3A is a view similar to that of FIG. 1B, but of a different embodiment of the present invention.
Figure 6A:
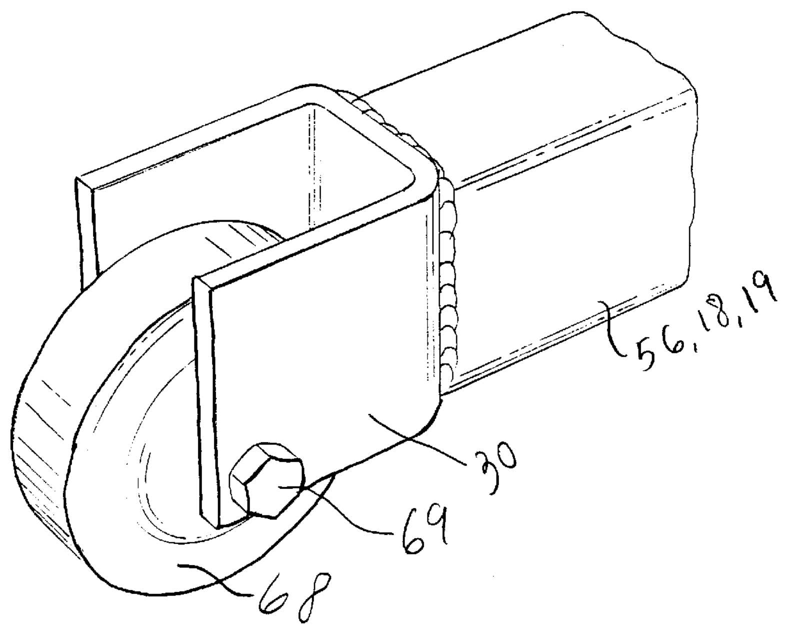

Next, the embodiment partially shown in FIG. 3A is the same as the embodiment of FIG. 1A with the following exceptions. The FIG. 3A embodiment forms each leg from two separate tubular members that are joined together permanently as by a welded seam 60 at the vertex of the obtuse angle $\alpha$. Thus, the forward portions 19 of the legs of the embodiment of FIG. 3A are welded to the mid portions 18 of the legs.

Figure 3B:
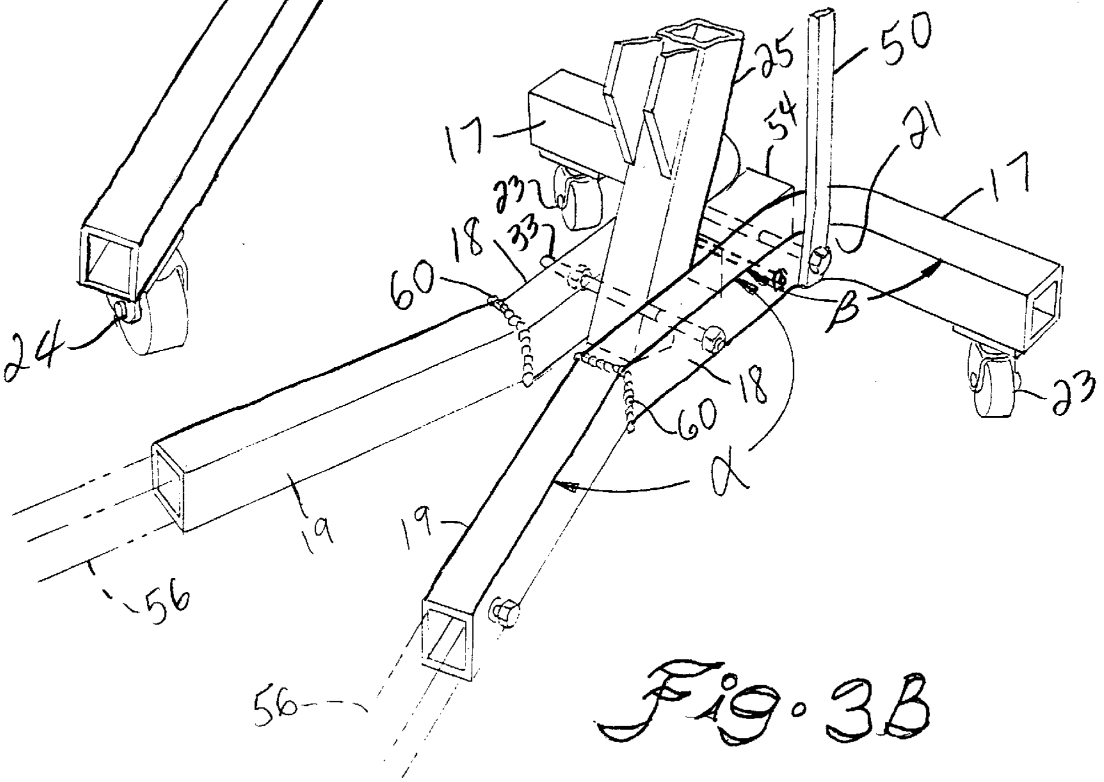
FIG. 3B is a view similar to that of FIG. 2B, but of different embodiment of the present invention.

The embodiment of FIG. 3B is the same as the embodiment shown in FIGS. 2A and 2B, except for the construction of each leg. In the FIG. 3B embodiment, each forward portion 19 of each leg is provided as a separate component from the unitary structure composing the mid portion 18 and rear portion 17 of each leg. The rear portions 17 and mid portions 18 are formed of a unitary tubular member having a second bend 21 forming the vertex of a right angle designated $\beta$ in FIG. 3B. Each forward portion 19 of each leg is rendered integral with the mid portion 18 and rear portion 17 of each leg by means of a permanent connection such as a welded seam 60 between one end of each forward portion 19 and the otherwise free end of each mid portion 18 of each leg. The FIG. 3B embodiment thus requires additional manufacturing steps and materials relative to the embodiment of FIGS. 2A and 2B and is more costly to produce than the embodiments of FIGS. 2A and 2B. This is because the use of a bending tool to form the first bend 20 in the embodiments of FIGS. 2A and 2B is a much less costly operation to perform than a welding operation or another operation that permanently attaches the forward portion 19 of the leg to the mid portion 18 of the leg. However, the embodiments of FIGS. 3A and 3B do establish the possibility of substituting a means of permanent attachment such as welding to fabricate each leg and particularly at the juncture where the obtuse angle designated Alpha ($\alpha$) in FIG. 3B is formed between the forward portion 19 and the mid portion 18 of each leg.

An advantage of the embodiment of FIGS. 4A, 4B, 8 and 9 over the embodiments of FIGS. 1A, 1B, 2A and 2B is related to the unitary back portion member 61 that results in a permanently joined leg component. This permanent assembly reduces the unwanted effects of bending moments and ensures structural integrity and increased lifting capacity. It also eliminates the task of assembling the spacer member 54 on the part of the customer.

One cost advantage of the embodiments of FIGS. 2A and 2B over the embodiments of FIGS. 4A, 4B, 8 and 9 is the replacement of a mechanical fastening step to attach the spacer 54 between the mid portions 18 of the legs for a welding step to attach the mid portions 18 of the legs to the unitary back portion member 61. Another cost advantage of the embodiments of FIGS. 2A and 2B over the embodiments of FIGS. 4A, 4B, 8 and 9 is the small packing carton that is possible because the spacer member 54 disassembles from the legs and permits them to be placed against one another in the carton. The permanently assembled undercarriage provided by the combination of the unitary back portion member 61 and the legs, prevents such disassembly.

The embodiment of FIG. 4C is like the embodiment of FIGS. 4A and 4B, except for the provision of the forward portion 19 of each leg being permanently attached to the mid portion 18 of each leg as by a means of permanent attachment such as a welded seam 60. Thus, the welded seam 60 shown in FIG. 4C substitutes for the bend 20 that orients the forward portion 19 at an obtuse angle designated Alpha ($\alpha$) relative to the mid portion 18 of each leg.

The embodiment shown in FIG. 4D resembles the embodiment of FIG. 4A for example and differs from the embodiment of FIGS. 1A and 1B insofar as the provision of a unitary tubular member 61 that forms the rear portions 17 of both legs and provides for the permanent joining of both legs in an integral undercarriage structure. However, the embodiment shown in FIG. 4D differs from the embodiment of FIG. 4A because the forward portion 19 of the embodiment shown in FIG. 4D is elongated rather than including a telescoping leg extension member 56 that is detachably connected to the forward portion 19 of each leg.

The alternative embodiment shown in FIGS. 5A and 5B differs from the embodiment of FIGS. 2A and 2B in several respects insofar as the provision of a unitary member 61 that forms the rear portions 17 of both legs and provides for the permanent joining of both legs in a single integral structure. Thus, each leg has a unitary member composed of the forward portion 19 and the mid portion 18. Moreover, the mid portions 18 of both the left and right legs are permanently attached to a unitary member 61 that functions as the rear portions 17 of both legs. The permanent attachment of the mid portions 18 of both legs to the unitary back portion member 61 can be effected as by welding a seam 62 for example.

The embodiment of FIGS. 5A and 5B is the same as the embodiment of FIG. 4C, except for the method of attachment of the stanchion 25 to the mid portions 18 of both legs of the crane. As shown in FIG. 5B for example, the base end 31 of stanchion 25 is permanently attached to a top mounting plate 64, which sits atop the top panels 15 of the adjacently disposed mid portions 18 of the left leg 12 and the right leg 11. As shown in FIG. 5B for example, a welded seam 63 attaches base end 31 of stanchion 25 to top mounting plate 64. The two legs are attached to the unitary back member 61, but are typically spaced apart a distance that is less than the width of the front panel 28 and back panel 29 of the stanchion 25, as shown in FIG. 5B for example.

Desirably, as shown in FIG. 5B, the side panels 26, 27 of the stanchion 25 should be disposed above the respective inwardly-facing side panels 14 of the mid portions 18 of the adjacent legs 11, 12. This is believed to be the best orientation for carrying the load that is supported by the is stanchion 25. As shown partially in phantom (dashed line) in FIG. 5B, desirably, a bottom mounting plate 65 is disposed against the bottom panels 16 of the mid portions 18 of the two legs so that the two legs are sandwiched between the top mounting plate 64 and the bottom mounting plate 65 and fastened thereto as by bolts 66 such as those shown in FIG. 5B for example.

The disadvantage of the embodiment shown in FIGS. 5A and 5B over the embodiment shown in FIG. 4C as well as the other embodiments of FIGS. 4A and 4B, 1A and 1B, 2A and 2B and 3A and 3B is in the difficulty in siting of the stanchion 25 symmetrically with respect to the legs as it is positioned atop the top panels 15 of the mid portions 18 of the legs. If the pre-drilled holes for the bolts 66 are not positioned correctly, whether the holes through the top and bottom panels 15, 16 of the mid portions 18 of the legs or the holes through the mounting plates 64, 65, the possibility exists for the stanchion to be positioned off-center. This poses challenges in the manufacturing process, and may lead to more costly manufacture due to rejects that result from improper siting of the holes, whether through the mounting plates 64, 65 or through the top and/or bottom panels 15, 16 of the mid portions 18 of each leg.

The embodiment of FIG. 5C bears some resemblance to the embodiment of FIGS. 2A and 2B as well as some resemblance to the embodiment of FIGS. 5A and 5B. The embodiment of FIG. 5C differs from the embodiment of FIGS. 2A and 2B in two main respects. First, the stanchion 25 is mounted on the top panels 15 of the mid portions 18 of the legs in a fashion similar to that shown in FIG. 5B for example, rather than disposed between the mid portions 18 of the legs and carried by a support member 33. In the embodiment of FIG. 5C, the top mounting plate 64 can be welded to the base end 31 of the stanchion 25.

Second, the embodiment of FIG. 5C positions the inwardly-facing panels 14 of the mid portions 18 of the legs in contact along the length of the mid portions 18 and thus does not include a spacer member 54 as is the case in the embodiment of FIGS. 2A and 2B for example. However, in the embodiment of FIG. 5C, each leg is formed of a unitary, rigid tubular member and is provided with a first bend 20 and a second bend 21 in a fashion similar to the embodiment of FIGS. 2A and 2B. Moreover, a connecting bolt 102 is disposed transversely through the mid portions 18 of the legs and so as to detachably connect the legs to each other. As an alternative to the connecting bolt 102, the legs can be permanently welded to each other along the length of the mid portions 18 of the legs. In addition, though not shown, a similar embodiment to the one shown in FIG. 5C can be provided in the same relationship as an embodiment such as shown in FIGS. 1A and 1B such that leg extension members 56 like those in FIGS. 2A and 2B would not be required.

The embodiment of FIG. 7 resembles the embodiment of FIG. 5C but differs from the embodiment of FIG. 5C primarily in the way that the stanchion 25 is connected to the legs. In the FIG. 7 embodiment, a spacer 92 is disposed between each of a pair of side plates 93 and the stanchion 25, which is disposed on and straddling the top panels 15 of the mid portions 18 of the legs. At least two bolts, and desirably a plurality of bolts 94, are disposed transversely through both side plates 93, both spacers 92 and the base end 31 of stanchion 25 to fasten these components together. Similarly, at least one and desirably two bolts 95 is/are disposed transversely through both side plates 93 and the mid portions 18 of the legs to fasten these components together.

One cost advantage of the embodiments of FIGS. 5C and 7 over the embodiments of FIGS. 5A and 5B is the elimination of the additional permanent attachment steps needed to attach the mid portions 18 to the unitary back portion 61 of the legs. The mechanical fastening mechanism used in the FIG. 7 embodiment has the advantage of eliminating the need for careful centering of the stanchion 25 with respect to the legs, as this centering occurs automatically as a result of the symmetry of the mechanical fastening arrangement.

The embodiment of FIG. 5D differs from the embodiment of FIGS. 5A and 5B in the configuration of the legs and the method of attachment of the two support straps 51 to the legs. As shown in FIG. 5D, the mid portions 18 of the legs are disposed at an obtuse angle (α) with respect to the forward portions 19 of the legs and also with respect to the rear portions 19 of the legs. Moreover, the rear portions 17 of the legs are provided by a unitary tubular member 61. Additionally, as shown in FIG. 5D, the legs intersect one another and the top panels 15 of the tubular rigid material forming each leg are disposed in the same plane. Mounting bolts 66 attach the top mounting plate 64 to the top panels 15 of the proximal ends of the forward portions 19 of the legs rather than to the top panels 15 of the mid portions 18 of the legs.

As shown in FIG. 5D, one end of each support strap 51 is attached to the outwardly-facing side panel 13 of the rear portion 17 of each leg rather than to the outwardly-facing side panel 13 of the mid portion 18 of each leg. Moreover, each support strap 51 has a 90° twist 59 in order to accommodate this difference in the location of the attachment and to add additional strength.

One cost disadvantage of the FIG. 5D embodiment relative to the embodiment of FIGS. 5A and 5B is the need to make several angular cuts and several angular welds during fabrication and assembly of the leg portions into an integral structure that is permanently attached to one another. This poses the possibility of mistakes that lead to rejects and waste, which increases the cost of production.

In the FIG. 5D embodiment, the centerline designated by the numeral 67 is perpendicular to rear portions 17 of the legs. The angle Alpha (α) is in the range of 135 degrees to 160 degrees, so that the included angle between the forward portions 19 of the legs is in the range of 20 degrees to 45 degrees. For an included angle of 40 degrees for example, the angle Theta (θ) in FIG. 5D would be one half that, which is 20 degrees. The angle Beta (β) in FIG. 5D is in the range of 100 degrees to 112.5 degrees. The particular angle chosen depends upon the desired application of the crane and the requirements of the customer. Moreover, the embodiment of FIG. 5D can be provided in an alternative embodiment that forms each leg out of a unitary member rather than requiring a leg extension member 56.

While preferred embodiments of the invention have been described using specific terms, such description is for illustrative purposes only, and it is to be understood that changes and variations may be made without departing from the spirit or scope of the following claims.

What is claimed is:

1. A mobile lifting device, comprising:

an undercarriage including a right leg and a left leg disposed opposite said right leg, each said leg being formed of rigid material;

a stanchion defining an elongated member formed of rigid material and having a base end and a top end opposite said base end, said base end of said stanchion being disposed between said legs and part of said stanchion extending vertically above said legs;

a support member disposed transversely through said legs and through said base end of said stanchion;

a lifting ram having a first end and a second end opposite said first end, said first end of said lifting ram being pivotally connected to said stanchion; and a boom being pivotally connected to said stanchion and pivotally connected to said second end of said lifting ram.

2. A device as in claim 1, wherein each said leg defines a tubular member.

3. A device as in claim 1, wherein said stanchion defines a tubular member.

4. A device as in claim 1, wherein said support member includes a bolt.

5. A device as in claim 1, wherein each said forward portion of each said leg being formed of a rear section and an extension member, each said extension member of each said leg being removably connected to each said rear section of each said forward portion of each said leg.

6. A device as in claim 5, further comprising:

at least one storage eyelet mounted on said stanchion and configured to receive at least one leg extension member when said leg extension member is detached from one of said legs.

7. A device as in claim 5, wherein each said extension member of each said leg being removably connected to each said rear section of each said forward portion of each said leg by a telescoping connection.

8. A device as in claim 1, further comprising:

a spacer member disposed between said mid portions of said legs and connected to said legs.

9. A device as in claim 1, further comprising:

a back brace defining a right angle plate fitted over said rear portions of said legs.

10. A device as in claim 1, further comprising:

a U-shaped mounting member having a base portion attached at one end of said boom and pivotally connected to said top end of said stanchion.

11. A device as in claim 1, wherein:

said lifting ram includes an hydraulic cylinder member and a piston rod member defining a piston disposed within said cylinder member, one of said cylinder member and said piston rod member being pivotally connected to said stanchion between said base end and said top end;

said piston rod member further defines a piston rod having one end connected to said piston and disposed within said cylinder member, said piston rod further defines a free end disposed opposite said end connected to said piston; and said free end of said piston rod member being pivotally connected to one of said boom and said stanchion between said base end and said top end of said stanchion.

12. A device as in claim 1, further comprising:

a right support strap and a left support strap, each said support strap defining a rigid member, each said rigid member of said strap having a pair of opposed ends, said right strap having one end connected to said stanchion and said opposite end connected to said right leg, said left strap having one end connected to said stanchion and said opposite end connected to said left leg.

13. A device as in claim 1, further comprising a rolling a member connected to said base end of said stanchion.

14. A device as in claim 13, wherein said rolling member includes a pair of opposed attachment flanges forming a slot therebetween and said rolling member receives a portion of said base end of said stanchion in said slot.

15. A device as in claim 13, further comprising:

a slide plate that is connected to said rolling member and adjustably attached to said base end of said stanchion.

16. A device as in claim 13, further comprising:

a channel mounted transversely near said top end of said stanchion and defining an opening that is configured to receive a handle therein.

17. A device as in claim 1, wherein each said leg defines a forward portion and a mid portion, each said mid and forward portions defines an elongated straight section, said mid and forward portions of each said leg being disposed with respect to one another so as to form an obtuse angle.

18. A device as in claim 17, wherein said mid and forward portions of each said leg being formed as a unitary member that includes a first bend as the vertex of said obtuse angle.

19. A device as in claim 18, wherein an elongated indentation is defined at said first bend and configured so that said indentation extends into part of said mid portion and part of said forward portion of each said leg.

20. A device as in claim 18, further comprising:

a first elongated back portion connected to said mid portion of said right leg;

a second elongated back portion connected to said mid portion of said left leg; and wherein said mid and back portions of each said leg being formed as a unitary member that includes a second bend as the vertex of a right angle.

21. A device as in claim 17, wherein said undercarriage further includes a unitary back portion member configured as an elongated straight section and said mid portion of each said leg being connected to said unitary back portion member.

22. A mobile lifting device, comprising:

an undercarriage including a right leg and a left leg disposed opposite said right leg;

a stanchion defining an elongated tubular member formed of rigid material and having a base end and a top end opposite said base end, said base end of said stanchion being disposed between said legs and part of said stanchion extending vertically above said legs;

a support member disposed transversely through said legs and through said base end of said stanchion;

a lifting ram having a first end and a second end opposite said first end, said first end of said lifting ram being pivotally connected to said stanchion; and a boom being pivotally connected to said stanchion and pivotally connected to said second end of said lifting ram.

23. A mobile lifting device, comprising:

a right leg formed of rigid material and defining a right inner side panel;

a left leg disposed opposite said right leg, said left leg being formed of rigid material and defining a left inner side panel;

a stanchion formed of tubular rigid material and having a base end and a top end opposite said base end, said base end of said stanchion defining a left base side panel, a right base side panel disposed opposite said left base side panel, a base front panel connecting said left base and right base side panels, and a base back panel disposed opposite said base front panel and connecting said left and right base side panels, said base end of said stanchion being disposed between said legs and connected to said legs with said stanchion's right base side panel contacting said right leg's inner side panel and with said stanchion's left base side panel contacting said left leg's inner side panel;

a lifting ram having a first end and a second end opposite said first end, said first end of said lifting ram being pivotally connected to said stanchion; and a boom being pivotally connected to said stanchion and pivotally connected to said second end of said lifting ram.

24. A device as in claim 23, wherein said rigid material forming each said leg includes a pair of opposed side panels and said base end of said stanchion is connected to said legs by a support member disposed transversely through said side panels of said legs and through said base end of said stanchion disposed between said legs.

25. A mobile lifting device, comprising:

a right leg formed of tubular rigid material;

a left leg disposed opposite said right leg, said left leg being formed of tubular rigid material, said tubular rigid material forming each said leg includes a pair of opposed side panels;

each said leg defining a back portion, a forward portion and a mid portion disposed between said back and forward portions, each of said back, mid and forward portions defining an elongated straight section, said back, mid and forward portions being formed as a unitary member, said unitary member includes a first bend as the vertex of an obtuse angle formed between said mid and forward portions of each said leg, said unitary member includes a second bend as the vertex of a right angle formed between said mid and back portions of each said leg;

a stanchion formed of tubular rigid material, said tubular rigid material forming said stanchion includes a pair of opposed side panels, said stanchion being disposed symmetrically between and above said legs and having a base end and a top end opposite said base end;

a support member disposed to extend transversely through both said side panels of each said leg and through both said side panels of said base end of said stanchion;

a boom being pivotally connected to said stanchion;

a lifting ram, said lifting ram including an hydraulic cylinder member and a piston rod member, said piston rod member defining a rod connected at one end to a piston disposed within said cylinder member, said rod having a free end disposed opposite said end connected to said piston, one of said cylinder member and said free end of said rod being pivotally connected to said stanchion between said base end and said top end, the other of said free end of said rod and said cylinder member being pivotally connected to said boom; and a right support strap and a left support strap, each said support strap defining a rigid member, each said rigid strap member having a pair of opposed ends, said right strap having one end connected to said stanchion and said opposite end connected to said right leg, said left strap having one end connected to said stanchion and said opposite end connected to said left leg.

26. A mobile lifting device, comprising:

an undercarriage including a right leg and a left leg disposed opposite said right leg, each said leg being formed of rigid material;

a right side plate connected to said right leg;

a left side plate connected to said left leg;

a stanchion defining an elongated tubular member formed of rigid material and having a base end and a top end opposite said base end, said base end of said stanchion being disposed above said legs and connected to said legs;

a right spacer disposed between said right side plate and said stanchion and connected to said right side plate and said stanchion;

a left spacer disposed between said left side plate and said stanchion and connected to said left side plate and said stanchion;

a lifting ram having a first end and a second end opposite said first end, said first end of said lifting ram being pivotally connected to said stanchion; and a boom being pivotally connected to said stanchion and pivotally connected to said second end of said lifting ram.

27. A mobile lifting device, comprising:

an undercarriage including a right leg and a left leg disposed opposite said right leg, each said leg being formed of rigid material;

a stanchion defining an elongated tubular member formed of rigid material and having a base end and a top end opposite said base end, said base end of said stanchion being disposed above said legs and connected to said legs;

a lifting ram having a first end and a second end opposite said first end, said first end of said lifting ram being pivotally connected to said stanchion;

a boom being pivotally connected to said stanchion and pivotally connected to said second end of said lifting ram; and wherein said rigid material forming each said leg includes at least one side panel and said side panel of each said leg being disposed in contact with said side panel of the other of said legs.

28. A mobile lifting device, comprising:

an undercarriage including a right leg and a left leg disposed opposite said right leg, each said leg being formed of rigid material;

a stanchion defining an elongated tubular member formed of rigid material and having a base end and a top end opposite said base end, said base end of said stanchion being disposed above said legs and connected to said legs;

a lifting ram having a first end and a second end opposite said first end, said first end of said lifting ram being pivotally connected to said stanchion;

a boom being pivotally connected to said stanchion and pivotally connected to said second end of said lifting ram; and wherein said rigid material forming each said leg includes a top panel connected to said side panel and said legs intersect one another and said top panels of said legs are disposed in the same plane.

29. A mobile lifting device, comprising:

an undercarriage including a right leg and a left leg disposed opposite said right leg, each said leg being formed of rigid material;

a connecting bolt disposed transversely through said legs and detachably connecting said legs to each other;

a stanchion defining an elongated tubular member formed of rigid material and having a base end and a top end opposite said base end, said base end of said stanchion being disposed above said legs and connected to said legs;

a first mounting plate connected to said base end of said stanchion, and wherein said mounting plate is removably connected to said legs;

a lifting ram having a first end and a second end opposite said first end, said first end of said lifting ram being pivotally connected to said stanchion; and a boom being pivotally connected to said stanchion and pivotally connected to said second end of said lifting ram.

30. A mobile lifting device, comprising:

an undercarriage including a right leg and a left leg disposed opposite said right leg, each said leg being formed of rigid material;

a stanchion defining an elongated tubular member formed of rigid material and having a base end and a top end opposite said base end, said base end of said stanchion being disposed above said legs and connected to said legs;

a first mounting plate connected to said base end of said stanchion, and wherein said mounting plate is removably connected to said legs;

a second mounting plate spaced apart from said first mounting plate so as to dispose said legs between said first and second mounting plates, said second mounting plate being connected to said legs;

a lifting ram having a first end and a second end opposite said first end, said first end of said lifting ram being pivotally connected to said stanchion; and a boom being pivotally connected to said stanchion and pivotally connected to said second end of said lifting ram.

* * * * *